(12) United States Patent
Matsunaga

(10) Patent No.: US 7,680,397 B2
(45) Date of Patent: Mar. 16, 2010

(54) METHOD AND APPARATUS FOR RECORDING DATA ON A RECORDING DISC, AND METHOD AND APPARATUS FOR RESTORING DATA RECORDED ON A RECORDING DISC

(75) Inventor: Yoshihiro Matsunaga, Sagamihara (JP)

(73) Assignee: Victor Company of Japan, Ltd., Yokohama (JP)

( * ) Notice: Subject to any disclaimer, the term of this patent is extended or adjusted under 35 U.S.C. 154(b) by 1329 days.

(21) Appl. No.: 11/098,560

(22) Filed: Apr. 5, 2005

(65) Prior Publication Data

US 2006/0077811 A1  Apr. 13, 2006

(30) Foreign Application Priority Data

Sep. 27, 2004 (JP) ............................. 2004-278876
Sep. 30, 2004 (JP) ............................. 2004-287357
Jan. 7, 2005 (JP) ............................. 2005-002216

(51) Int. Cl.
*H04N 5/00* (2006.01)
*H04N 5/225* (2006.01)
*H04N 7/00* (2006.01)
*H04J 3/22* (2006.01)
*H04L 12/28* (2006.01)
*G06F 3/06* (2006.01)
*G06F 13/00* (2006.01)
*G11B 5/09* (2006.01)

(52) U.S. Cl. ........................... 386/125; 386/46; 386/95; 348/220.1; 369/47.1; 370/395.64; 370/465; 711/4; 711/112

(58) Field of Classification Search ................. 386/125, 386/46, 120, E5.004, E5.072, E9.009, E9.013, 386/95, E5.064; 348/220.1; 369/47.1; 370/395.64, 370/465; 375/E7.02; 711/4, 112
See application file for complete search history.

(56) References Cited

U.S. PATENT DOCUMENTS

| | | | |
|---|---|---|---|
| 6,377,518 B1 | 4/2002 | Auwens et al. | |
| 6,567,409 B1* | 5/2003 | Tozaki et al. | 370/395.64 |
| 2001/0018727 A1* | 8/2001 | Ando et al. | 711/112 |
| 2002/0126984 A1* | 9/2002 | Hisatomi et al. | 386/46 |
| 2005/0083414 A1* | 4/2005 | Hidaka et al. | 348/220.1 |
| 2006/0008250 A1* | 1/2006 | Wang | 386/95 |
| 2006/0165388 A1* | 7/2006 | Uesaka et al. | 386/125 |

FOREIGN PATENT DOCUMENTS

| | | |
|---|---|---|
| JP | 08-273304 | 10/1996 |
| JP | 2000-021089 | 1/2000 |
| JP | 2002-247506 | 8/2002 |
| JP | 2003-109360 | 4/2003 |
| JP | 2004-213769 | 7/2004 |
| WO | 00/49503 | 8/2000 |

* cited by examiner

*Primary Examiner*—Thai Tran
*Assistant Examiner*—Syed Y Hasan
(74) *Attorney, Agent, or Firm*—Louis Woo

(57) ABSTRACT

Video object units are generated from a program stream. The generated video object units have navigation portions respectively, and compose video objects. The navigation portions are void of ending time information and search information. The video object units are sequentially recorded on the recording disc without being buffered. Ending time information and search information are detected from the program stream. A decision is made as to whether or not the recording of video object units composing one video object has been completed. Navigation information is generated which includes the ending time information and the search information, and which corresponds to the last recorded video object. The generated navigation information is recorded on zones in the recording disc which correspond to the navigation portions of the video object units composing the last recorded video object each time the recording of video object units composing one video object has been completed.

12 Claims, 15 Drawing Sheets

METHOD AND APPARATUS FOR RECORDING DATA ON A RECORDING DISC, AND METHOD AND APPARATUS FOR RESTORING DATA RECORDED ON A RECORDING DISC

BACKGROUND OF THE INVENTION

1. Field of the Invention

This invention generally relates to a method and an apparatus for recording data on a recording disc such as an optical disc. This invention particularly relates to a method and an apparatus for recording contents data such as audio data, video data, or audio-visual data on a rewritable DVD (digital versatile disc) in real time. In addition, this invention relates to a method and an apparatus for restoring data recorded on a recording disc such as a recordable or rewritable DVD. Furthermore, this invention relates to a computer program for restoring data recorded on a recording disc such as a recordable or rewritable DVD.

2. Description of the Related Art

DVDs are of several types including a rewritable type or a RAM type. The feature of a DVD of the rewritable type or the RAM type is that data can be recorded and reproduced thereon and therefrom a plurality of times.

The DVD-Video standards prescribe that during the recording of contents data on a DVD, management information inclusive of search information related to the contents data should also be recorded on the DVD. In general, contents data is divided into successive segments before being recorded on a DVD segment by segment. A management information piece is generated for every segment of the contents data. After the generation of a management information piece, a related contents-data segment and the management information piece are recorded on the DVD. Thus, the recording of a contents-data segment on the DVD remains inhibited until the preparations for recording a management information piece related to the contents-data segment are made. In other words, the preparations for recording the related management information piece are awaited. Such a waiting time causes a considerable delay in recording the contents data on the DVD. The recording delay deteriorates the real-time recording of the contents data.

In the event that the power feed to a DVD drive apparatus is interrupted during the recording of contents data on a DVD, a relatively great contents-data portion waiting to be recorded is lost due to the above-indicated recording delay.

U.S. Pat. No. 6,377,518 corresponding to Japanese patent application publication number P2002-530800A relates to a method of recording real-time information (video information) and control information related thereto in a recording area on a record carrier. The real-time information is subdivided into cells, and playback parameters for reproducing sequences of the cells are included in the control information. Within the recording area, the control information precedes the video information for playback functions of the recorded video. It is preferable that a recording is made in one pass, i.e., the video is to be recorded directly at its final location. Therefore, a recorder disclosed in U.S. Pat. No. 6,377,518 has a control unit for performing the following steps: first creating a free area by selecting a starting point within the recording area different from the beginning of the recording area, thereafter recording the real-time information from the starting point, and recording the control information in the free area.

In the method or the recorder of U.S. Pat. No. 6,377,518, the recording of control information related to real-time information causes a considerable delay in recording the real-time information.

Japanese patent application publication number P2003-109360A discloses a video recording and reproducing system including an optical disk drive and a hard disk drive. During a recording mode of operation of the system, the optical disk drive records audio-visual information and complete management information related thereto on a DVD while the hard disk drive periodically records partial management information (time map information) on a prescribed area in a hard disk for a backup purpose. The recording of the complete management information on the DVD follows the recording of the audio-visual information thereon. The management information is designed for managing the playback of the contents of the audio-visual information. In the event that the power feed to the system is interrupted during the recording mode of operation, partial management information remains in the prescribed area of the hard disk although complete management information related to currently-recorded audio-visual information fails to be recorded on the DVD. When the power feed to the system restarts, the partial management information is read out from the prescribed area of the hard disk and is then recorded on the DVD as complete management information related to the audio-visual information recorded up to the moment of the occurrence of the interruption of the power feed. Therefore, the recorded audio-visual information can be properly reproduced from the DVD by referring to the complete management information. In other words, it is possible to restore the audio-visual information recorded on the DVD.

In the system of Japanese application P2003-109360A, partial management information (time map information) is periodically recorded on the hard disk at intervals of, for example, one minute for a backup purpose. Thus, in the case where the moment of the occurrence of the interruption of the power feed is far away from the moment of the last recording of partial management information, a management information piece for a relatively-large end portion of audio-visual information recorded on the DVD fails to be backed up so that the relatively-large end portion of the recorded audio-visual information can not be restored. The system of Japanese application P2003-109360A tends to be high in cost due to the presence of the hard disk drive.

It is known to replace a hard disk drive with a nonvolatile memory such as a nonvolatile RAM in a system similar to that in Japanese application P2003-109360A. In this case, the presence of the nonvolatile memory causes the system to be high in cost.

There is a DVD recording apparatus equipped with a normal power supply and a backup power supply using a storage battery. In the event that the normal power supply fails, the backup power supply replaces the normal power supply to keep the recording of data on a DVD. The presence of the backup power supply causes the apparatus to be high in cost and heavy in weight.

SUMMARY OF THE INVENTION

It is a first object of this invention to provide a method of recording data on a recording disc which has better real-time recording performances.

It is a second object of this invention to provide an apparatus for recording data on a recording disc which has better real-time recording performances.

It is a third object of this invention to provide a method of recording data on a recording disc which prevents a relatively great data portion from being lost in the event that the power feed to a related disc drive apparatus is interrupted.

It is a fourth object of this invention to provide an apparatus for recording data on a recording disc which prevents a relatively great data portion from being lost in the event that the power feed thereto is interrupted.

It is a fifth object of this invention to provide a method of restoring data which has been recorded on a recording disc before the power feed to a disc drive apparatus is interrupted.

It is a sixth object of this invention to provide an apparatus for restoring data which has been recorded on a recording disc before the power feed to a disc drive apparatus is interrupted.

It is a seventh object of this invention to provide a computer program for restoring data which has been recorded on a recording disc before the power feed to a disc drive apparatus is interrupted.

A first aspect of this invention provides an apparatus for recording data on a recording disc. The apparatus comprises a first generator for generating a program stream from input video data; a second generator for sequentially generating video object units from the program stream generated by the first generator, the generated video object units having navigation portions respectively and composing video objects, the navigation portions being void of ending time information and search information; a first recorder for sequentially recording the video object units generated by the second generator on the recording disc without buffering the video object units; a detector for detecting ending time information and search information from the program stream generated by the first generator; a deciding device for deciding whether or not the first recorder has completed the recording of video object units composing one video object; a third generator for generating navigation information which includes the ending time information and the search information detected by the detector, and which corresponds to the last video object recognized by the deciding device; and a second recorder for recording the navigation information generated by the third generator on zones in the recording disc which correspond to the navigation portions of the video object units composing the last video object recognized by the deciding device each time the deciding device decides that the first recorder has completed the recording of video object units composing one video object.

A second aspect of this invention provides a method of recording data on a recording disc. The method comprises the steps of (a) generating a program stream from input video data; (b) sequentially generating video object units from the program stream generated by the step (a), the generated video object units having navigation portions respectively and composing video objects, the navigation portions being void of ending time information and search information; (c) sequentially recording the video object units generated by the step (b) on the recording disc without buffering the video object units; (d) detecting ending time information and search information from the program stream generated by the step (a); (e) deciding whether or not the step (c) has completed the recording of video object units composing one video object; (f) generating navigation information which includes the ending time information and the search information detected by the step (d), and which corresponds to the last video object recognized by the step (e); and (g) recording the navigation information generated by the step (f) on zones in the recording disc which correspond to the navigation portions of the video object units composing the last video object recognized by the step (e) each time the step (e) decides that the step (c) has completed the recording of video object units composing one video object.

A third aspect of this invention provides an apparatus for restoring data recorded on a recording disc. The apparatus comprises a detector for detecting an imperfect video title set recorded on the recording disc, the imperfect video title set being void of video title set information and having an empty portion assigned to video title set information, the imperfect video title set including normal video objects and an imperfect video object; a reader for reading out the normal video objects and the imperfect video object from the imperfect title set detected by the detector; an extractor for extracting identifier information and address information from playback management information in the normal video objects and the imperfect video object read out by the reader; a first generator for generating first video title set information concerning the normal video objects in response to the identifier information and the address information extracted by the extractor; a first recorder for recording the first video title set information generated by the first generator on the empty portion of the imperfect video title set to correct the imperfect video title set except the imperfect video object into a first perfect video title set recorded on the recording disc; a second generator for generating second video title set information concerning the imperfect video object in response to the identifier information and the address information extracted by the extractor; a corrector for correcting the playback management information in the imperfect video object read out by the reader in response to the identifier information and the address information extracted by the extractor to convert the imperfect video object into a perfect video object; a second recorder for recording the perfect video object generated by the corrector on the recording disc; and a third recorder for recording the second video title set information generated by the second generator on the recording disc to form a second perfect video title set recorded on the recording disc and having the perfect video object recorded by the second recorder.

A fourth aspect of this invention provides a computer program for enabling a computer to carry out steps comprising the steps of (a) detecting an imperfect video title set recorded on the recording disc, the imperfect video title set being void of video title set information and having an empty portion assigned to video title set information, the imperfect video title set including normal video objects and an imperfect video object; (b) reading out the normal video objects and the imperfect video object from the imperfect title set detected by the step (a); (c) extracting identifier information and address information from playback management information in the normal video objects and the imperfect video object read out by the step (b); (d) generating first video title set information concerning the normal video objects in response to the identifier information and the address information extracted by the step (c); (e) recording the first video title set information generated by the step (d) on the empty portion of the imperfect video title set to correct the imperfect video title set except the imperfect video object into a first perfect video title set recorded on the recording disc; (f) generating second video title set information concerning the imperfect video object in response to the identifier information and the address information extracted by the step (c); (g) correcting the playback management information in the imperfect video object read out by the step (b) in response to the identifier information and the address information extracted by the step (c) to convert the imperfect video object into a perfect video object; (h) recording the perfect video object generated by the step (g) on the recording disc; and (i) recording the second video title set information generated by the step (f) on the recording disc to form a second perfect video title set recorded on the recording disc and having the perfect video object recorded by the step (h).

A fifth aspect of this invention provides a method of restoring data recorded on a recording disc. The method comprises the steps of (a) detecting an imperfect video title set recorded on the recording disc, the imperfect video title set being void of video title set information and having an empty portion assigned to video title set information, the imperfect video title set including normal video objects and an imperfect video object; (b) reading out the normal video objects and the imperfect video object from the imperfect title set detected by the step (a); (c) extracting identifier information and address information from playback management information in the normal video objects and the imperfect video object read out by the step (b); (d) generating first video title set information concerning the normal video objects in response to the identifier information and the address information extracted by the step (c); (e) recording the first video title set information generated by the step (d) on the empty portion of the imperfect video title set to correct the imperfect video title set except the imperfect video object into a first perfect video title set recorded on the recording disc; (f) generating second video title set information concerning the imperfect video object in response to the identifier information and the address information extracted by the step (c); (g) correcting the playback management information in the imperfect video object read out by the step (b) in response to the identifier information and the address information extracted by the step (c) to convert the imperfect video object into a perfect video object; (h) recording the perfect video object generated by the step (g) on the recording disc; and (i) recording the second video title set information generated by the step (f) on the recording disc to form a second perfect video title set recorded on the recording disc and having the perfect video object recorded by the step (h).

A sixth aspect of this invention provides an apparatus for restoring data recorded on a recording disc. The apparatus comprises a detector for detecting an imperfect video title set recorded on the recording disc, the imperfect video title set being void of video title set information and having an empty portion assigned to video title set information, the imperfect video title set including normal video objects and an imperfect video object; a reader for reading out the normal video objects and the imperfect video object from the imperfect title set detected by the detector; an extractor for extracting identifier information and address information from playback management information in the normal video objects and the imperfect video object read out by the reader; a generator for generating video title set information concerning the normal video objects and the imperfect video object in response to the identifier information and the address information extracted by the extractor; a corrector for correcting the playback management information in the imperfect video object read out by the reader in response to the video title set information generated by the generator to convert the imperfect video object into a perfect video object; a first recorder for recording the perfect video object generated by the corrector over the imperfect video object on the recording disc; and a second recorder for recording the video title set information generated by the generator on the empty portion of the imperfect video title set to correct the imperfect video title set into a perfect video title set recorded on the recording disc and having the perfect video object instead of the imperfect video object.

A seventh aspect of this invention provides a computer program for enabling a computer to carry out steps comprising the steps of (a) detecting an imperfect video title set recorded on the recording disc, the imperfect video title set being void of video title set information and having an empty portion assigned to video title set information, the imperfect video title set including normal video objects and an imperfect video object; (b) reading out the normal video objects and the imperfect video object from the imperfect title set detected by the step (a); (c) extracting identifier information and address information from playback management information in the normal video objects and the imperfect video object read out by the step (b); (d) generating video title set information concerning the normal video objects and the imperfect video object in response to the identifier information and the address information extracted by the step (c); (e) correcting the playback management information in the imperfect video object read out by the step (b) in response to the video title set information generated by the step (d) to convert the imperfect video object into a perfect video object; (f) recording the perfect video object generated by the step (e) over the imperfect video object on the recording disc; and (g) recording the video title set information generated by the step (d) on the empty portion of the imperfect video title set to correct the imperfect video title set into a perfect video title set recorded on the recording disc and having the perfect video object instead of the imperfect video object.

An eighth aspect of this invention provides a method of restoring data recorded on a recording disc. The method comprises the steps of (a) detecting an imperfect video title set recorded on the recording disc, the imperfect video title set being void of video title set information and having an empty portion assigned to video title set information, the imperfect video title set including normal video objects and an imperfect video object; (b) reading out the normal video objects and the imperfect video object from the imperfect title set detected by the step (a); (c) extracting identifier information and address information from playback management information in the normal video objects and the imperfect video object read out by the step (b); (d) generating video title set information concerning the normal video objects and the imperfect video object in response to the identifier information and the address information extracted by the step (c); (e) correcting the playback management information in the imperfect video object read out by the step (b) in response to the video title set information generated by the step (d) to convert the imperfect video object into a perfect video object; (f) recording the perfect video object generated by the step (e) over the imperfect video object on the recording disc; and (g) recording the video title set information generated by the step (d) on the empty portion of the imperfect video title set to correct the imperfect video title set into a perfect video title set recorded on the recording disc and having the perfect video object instead of the imperfect video object.

This invention provides advantages as follows. While a prior-art apparatus causes a recording delay corresponding to one VOB, this invention does not cause such a recording delay. Therefore, this invention provides higher real-time recording performances. In the event that recording operation is forced to end, a greater amount of contents data can be recorded on a recording disc in comparison with a prior-art design. Thus, a greater amount of contents data can be reproduced from the recording disc thereafter.

Forced end of operation of a recording apparatus due to an interruption of the power feed thereto causes an imperfect VTS (video title set) to be recorded on a recording disc. This invention can correct the imperfect VTS into perfect VTSs recorded on the recording disc. Thus, this invention enables video and audio data in the imperfect VTS to be recognized and reproduced from the recording disc by a recording-disc player.

This invention replaces an imperfect video object recorded on a recording disc with a perfect video object. Therefore, the imperfect video object is prevented from forming an ineffective region in the recording disc. Accordingly, the recording area on the recording disc can be efficiently used.

DETAILED DESCRIPTION OF THE INVENTION

Prior-art apparatuses for DVDs will be explained below for a better understanding of this invention.

Figure 1:
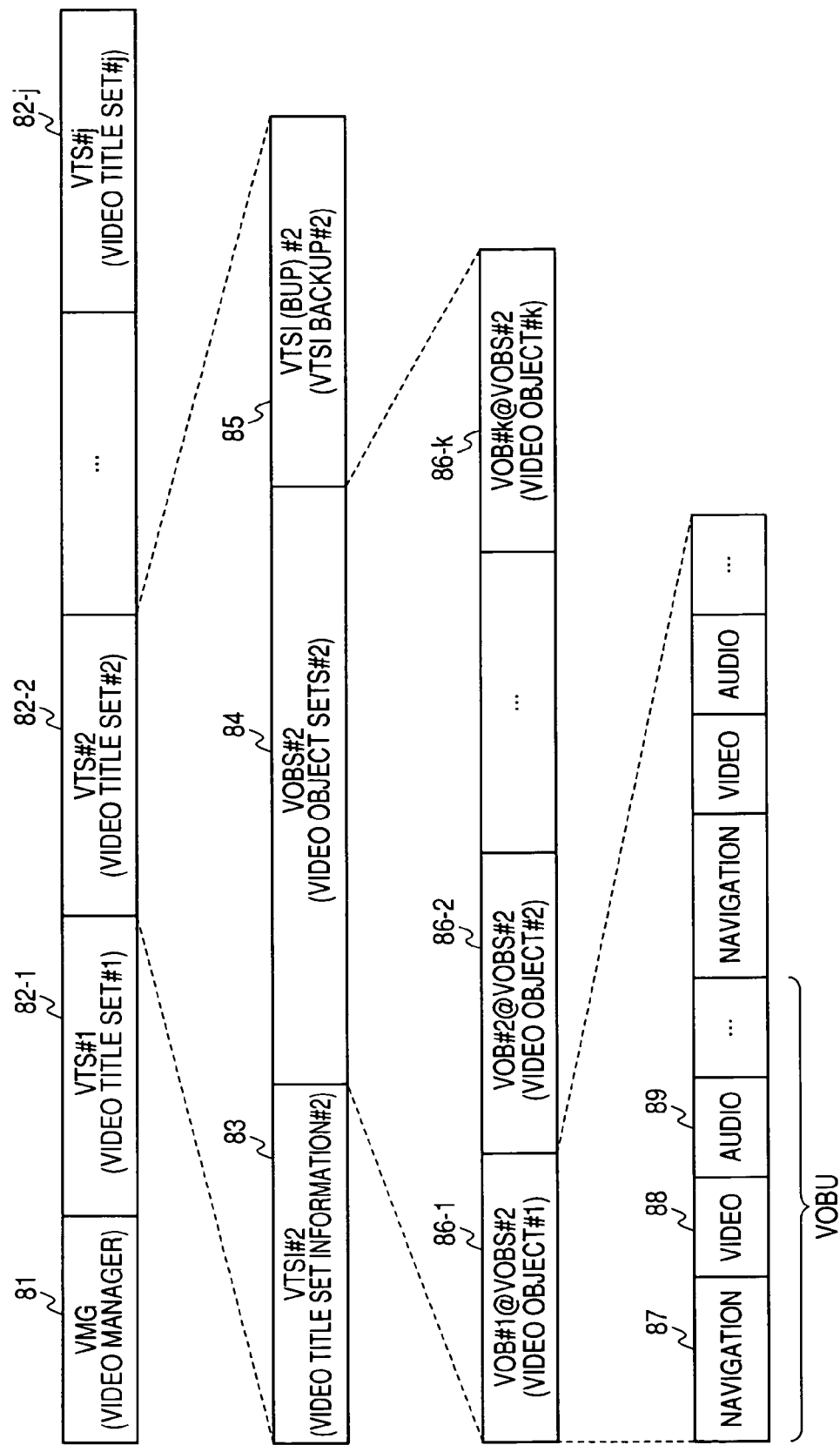
FIG. 1 is a diagram of an example of the logical data structure of a video and audio data area on a DVD which conforms to the DVD-Video standards.

FIG. 1 shows an example of the logical data structure of a video and audio data area on a DVD which conforms to the DVD-Video standards. The video and audio data area stores not only pure video and audio data but also other data necessary for the playback of the contents of the pure video and audio data. The video and audio data area is of a hierarchical structure.

As shown in FIG. 1, the first layer in the video and audio data area is composed of a VMG (video manager) 81 and VTSs (video title sets) 82-1, 82-2, . . . , and 82-j, where "j" denotes the total number of video titles. The VTSs 82-1, 82-2, and 82-j are also numbered as VTS#1, VTS#2, . . . , and VTS#j, respectively. The VMG 81 has a packet loaded with management information for the whole of the video and audio area. The VMG 81 is divided into sections (not shown).

Each VTS 82 is composed of a VTSI (video title set information) zone 83, a VOBS (video object set) zone 84, and a VTSI(BUP) zone 85. The VTSI zone 83 stores management information, that is, video title set information (VTSI), related to the corresponding VTS 82. The VTSI(BUP) zone 85 stores backup data for the management information in the VTSI zone 83. The backup data is identical in contents to the management information. The VOBS zone 84 stores video and audio data. The VOBS zone 84 may also store data representing menu contents.

As shown in FIG. 1, the VOBS zone 84 has a set of VOBs (video objects) 86-1, 86-2, . . . , and 86-k, where "k" denotes a given natural number. The VOBs 86-1, 86-2, . . . , and 86-k are loaded with video and audio data only. The VOBs 86-1, 86-2, . . . , and 86-k are also numbered as VOB#1, VOB#2, . . . , and VOB#k, respectively.

Each VOB 86 has a plurality of VOBUs (video object units) respectively. Each VOB 86 may have a set of video cells (not shown) each containing a plurality of VOBUs. Each VOBU is a group of a navigation zone 87, video zones 88 (only one of which is shown), and audio zones 89 (only one of which is shown). The navigation zone 87 is a navigation pack. The video zones 88 are video packs. The audio zones 89 are audio packs. The navigation zone 87 stores navigation information used at the time of the playback of the contents of the video and audio data. The navigation information includes playback management information, search information (VOBU search information), and ending time information (VOB video display ending time information). Each video zone 88 stores encoded video data. Each audio zone 89 stores encoded audio data. The search information and the ending time information in the navigation zone 87 mean search information (VOBU_SRI) for the related VOBU and ending time information (VOB_V_E_PTM in SML_PBI) for the related VOB 86. The navigation information in the navigation zone 87 or the playback management information therein contains VOB identifier information and VOB start address information.

A first prior-art apparatus designed to record data on a DVD operates as follows. The first prior-art apparatus provides the DVD with a video and audio data area having the logical data structure of FIG. 1. The first prior-art apparatus secures a recording region on the DVD for a VMG 81 before sequentially implementing the following steps concerning one or more VTSs 82. Specifically, the first prior-art apparatus secures a recording region on the DVD which should be used as a VTSI zone 83. Subsequently, the first prior-art apparatus records data on the DVD to form a VOBS zone 84. After the recording of data to form the VOBS zone 84 has been completed, the first prior-art apparatus records video title set information (VTSI) on the secured recording region which should be used as a VTSI zone 83. Consequently, the VTSI zone 83 is formed. Then, the first prior-art apparatus records backup data on the DVD to form a VTSI(BUP) zone 85. The backup data is the same as the VTSI. After the recording of data and information concerning all the VTSs 82 has been completed, the first prior-art apparatus records management information for the whole of the video and audio area on the secured recording region for the VMG 81.

Specifically, the recording of data concerning each VOB 86 is as follows. The first prior-art apparatus prepares video and audio data to be assigned to video zones 88 and audio zones 89 in the VOB 86. Thereafter, the first prior-art apparatus generates search information and other information which correspond to the prepared video and audio data, and which should be assigned to a navigation zone 87. Then, the first prior-art apparatus combines the generated search information and other information, and the prepared video and audio data into a format corresponding to the data structure concerning the VOB 86. Subsequently, the first prior-art apparatus records the combination of the search information and other information, and the video and audio data on the DVD to form the VOB 86.

As previously mentioned, in the first prior-art apparatus, search information and other information are generated after video and audio data have been prepared. The first prior-art apparatus includes a storage device such as a memory or a hard disk. The first prior-art apparatus implements a 2-pass recording procedure in which data corresponding to an image of each VOB 86 is provided in the storage device before being transferred therefrom and being recorded on the DVD to form the VOB 86. Therefore, the timing of the recording of VOB image data on the DVD delays from the timing of the inputting of the VOB image data into the storage device at least a 1-VOB-corresponding time.

Figure 2:
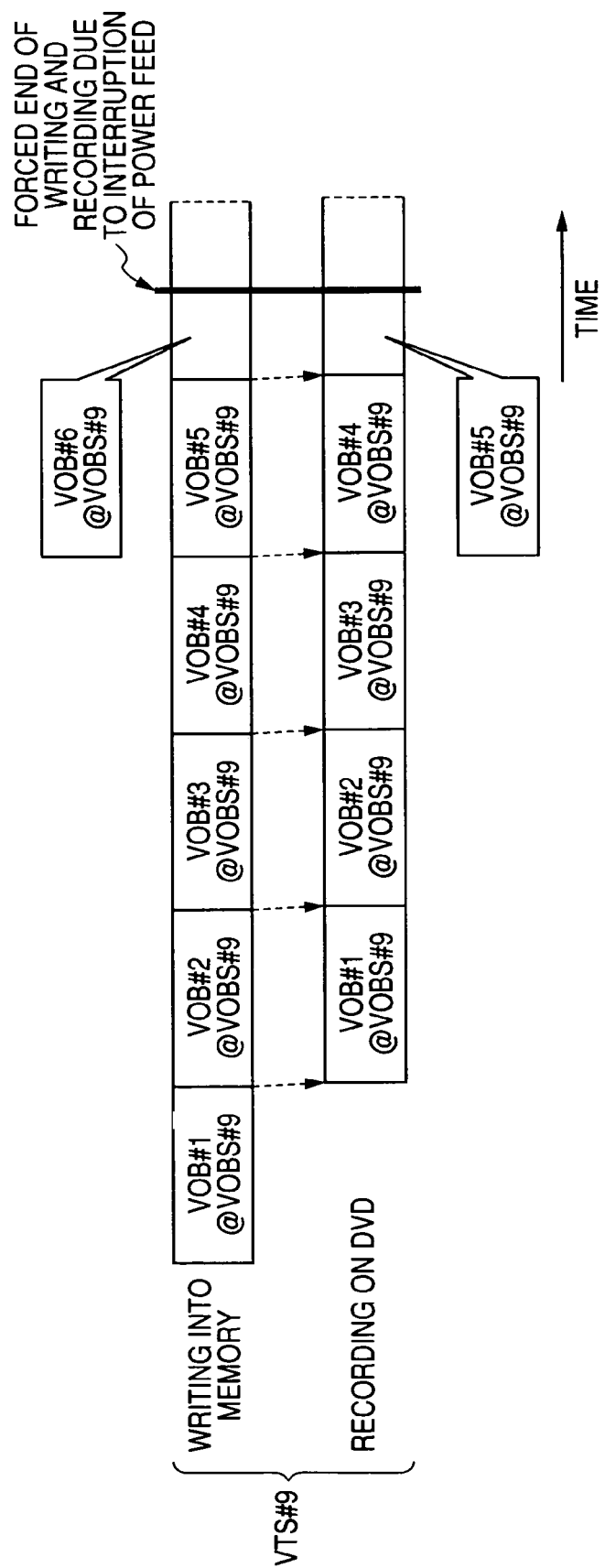
FIG. 2 is a time-domain diagram of timings of storing VOBs into a memory and timings of recording VOBs on a DVD in a prior-art apparatus.

At a certain stage in the recording of data on a DVD, video and audio data concerning a VOB#6@VOBS#9 in a VTS#9 (data corresponding to an image of the VOB#6@VOBS#9 in the VTS#9) is being written into the memory which forms the storage device. With reference to FIG. 2, it is assumed that at this stage, the recording operation of the first prior-art apparatus is forced to end due to the occurrence of a problem such as an interruption of the power feed to the apparatus. Since the above-indicated 1-VOB-corresponding delay exists, the moment of the forced end of the recording operation of the first prior-art apparatus is in a time interval during which video and audio data concerning a VOB#5@VOBS#9 in the VTS#9 (data corresponding to an image of the VOB#5@VOBS#9 in the VTS#9) is being recorded on the DVD.

As a result of the forced end of the recording operation of the first prior-art apparatus, management information for a VTSI#9 zone 86 and a VTSI(BUP)#9 zone 85 fails to be recorded on the DVD. Therefore, the VTS#9 on the DVD has an imperfect data structure. Although video and audio data concerning a VOB#1 to a VOB#4, and a portion of video and audio data concerning the VOB#5 are on the DVD, information representing the on-disc positions (the addresses) of these video and audio data is absent from the DVD since the related VTSI and VTSI(BUP) fail to be recorded thereon. Thus, in the case where a reproducing apparatus (a DVD player) drives the DVD thereafter, it is difficult for the reproducing apparatus to detect the on-disc positions of the video and audio data concerning the VOB#1 to the VOB#4, and the portion of the video and audio data concerning the VOB#5. Consequently, the reproducing apparatus can not read out these data from the DVD.

A second prior-art apparatus designed to drive a DVD improves over the first prior-art apparatus. The second prior-art apparatus is equipped with a disc data restoring system. It is assumed that the recording operation of the second prior-art apparatus is forced to end similarly to the above-mentioned case regarding the first prior-art apparatus. The disc data restoring system makes effective the recorded video and audio data concerning the VOB#1 to the VOB#4, and the portion of the recorded video and audio data concerning the VOB#5. Therefore, the second prior-art apparatus can reproduce these data from the DVD. In the case where the forced end of the recording operation of the second prior-art apparatus is caused by an interruption of the power feed thereto, the remaining portion of the video and audio data concerning the VOB#5 and a portion of the video and audio data concerning the VOB#6 which are in a memory (a storage device) disappear due to the interruption of the power feed. Thus, the portions of the vide and audio data concerning the VOB#5 and the VOB#6 are lost. Accordingly, it is difficult for the second prior-art apparatus to restore the portions of the video and audio data concerning the VOB#5 and the VOB#6. It is desirable to reduce the amount of lost data.

A third prior-art apparatus designed to record data on a DVD is disclosed in U.S. Pat. No. 6,377,518. The third prior-art apparatus records real-time information (video information) and control information related thereto in a recording area on the DVD. The real-time information is subdivided into cells, and playback parameters for reproducing sequences of the cells are included in the control information. Within the recording area, the control information precedes the video information for playback functions of the recorded video. It is preferable that a recording is made in one pass, i.e., the video is to be recorded directly at its final location. Therefore, the third prior-art apparatus has a control unit for performing the following steps: first creating a free area by selecting a starting point within the recording area different from the beginning of the recording area, thereafter recording the real-time information from the starting point, and recording the control information in the free area.

Specifically, the third prior-art apparatus implements the recording of one VTS on a DVD as follows. The third prior-art apparatus creates a free area for a VMG and VTSI#1 in a head of a recording area on the DVD. Thereafter, the third prior-art apparatus records a VOBS#1 on a first portion of the recording area which follows the free area for the VMG and the VTSI#1. Subsequently, the third prior-art apparatus records the VTSI#1 on the free area, and records VTSI(BUP)#1 on a second portion of the recording area which follows the first portion thereof. Finally, the third prior-art apparatus records the VMG on the free area.

More detailed operation of the third prior-art apparatus seems to be as follows. To record a VOB#1 of the VOBS#1 on the DVD, the third prior-art apparatus stores video and audio data concerning the VOB#1 in a memory, and generates navigation information related to the stored video and audio data. Thereafter, in the third prior-art apparatus, data corresponding to an image of the VOB#1 is provided in the memory on the basis of the stored video and audio data, and the generated navigation information. Subsequently, the VOB#1 image data is transferred from the memory, and is recorded on the DVD. Accordingly, the timing of the recording of the VOB#1 image data on the DVD delays from the timing of the inputting of the VOB#1 image data into the memory at least a 1-VOB-corresponding time. Such a delay causes a relatively great amount of data to be lost upon the occurrence of an interruption of the power feed to the apparatus.

FIRST EMBODIMENT

Figure 3:
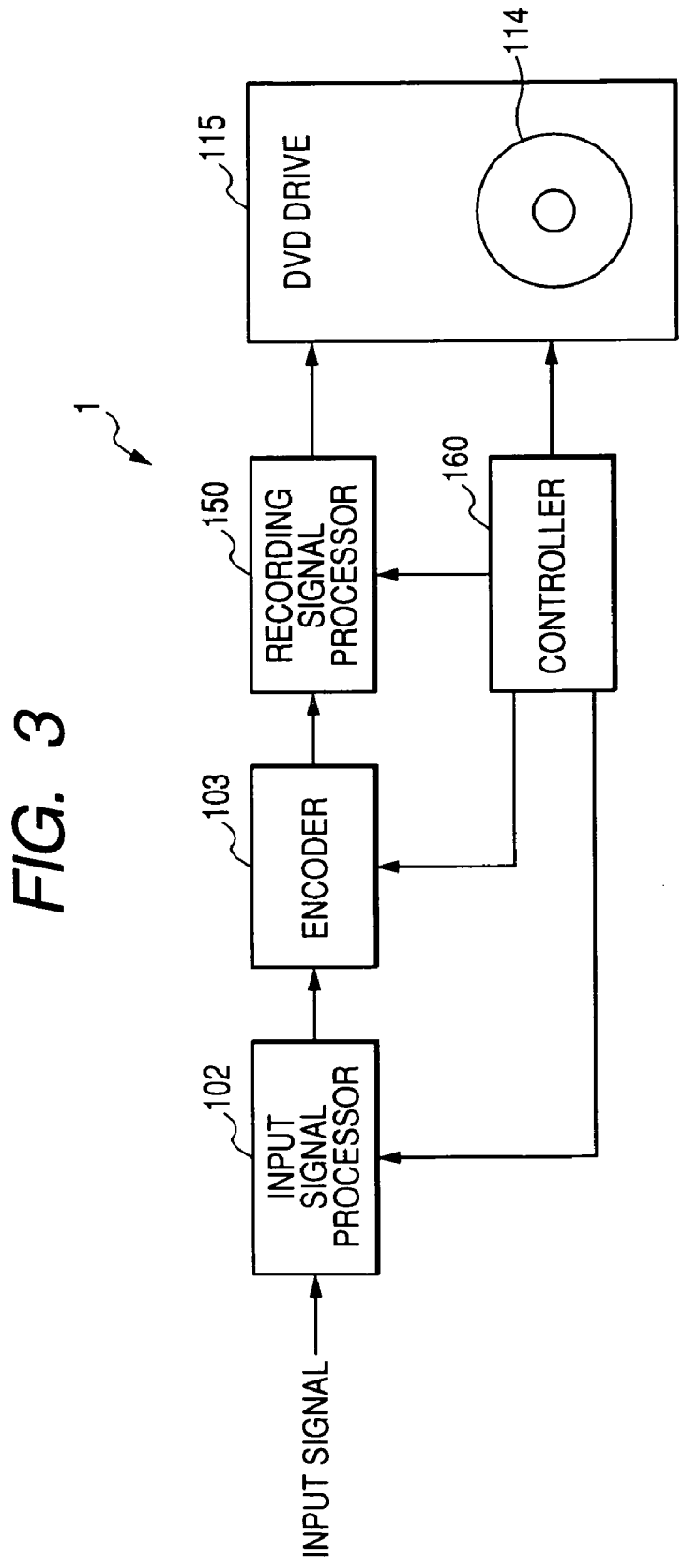
FIG. 3 is a block diagram of a recording apparatus according to a first embodiment of this invention.

FIG. 3 shows an apparatus 1 for recording data on a DVD 114 according to a first embodiment of this invention. The DVD 114 is of a rewritable type. Thus, data can be recorded and reproduced on and from the DVD 114 a plurality of times. The DVD 114 is also referred to as the rewritable disc 114. Data recorded on the DVD 114 by the recording apparatus 1 has the structure same as that in FIG. 1.

Figure 4:
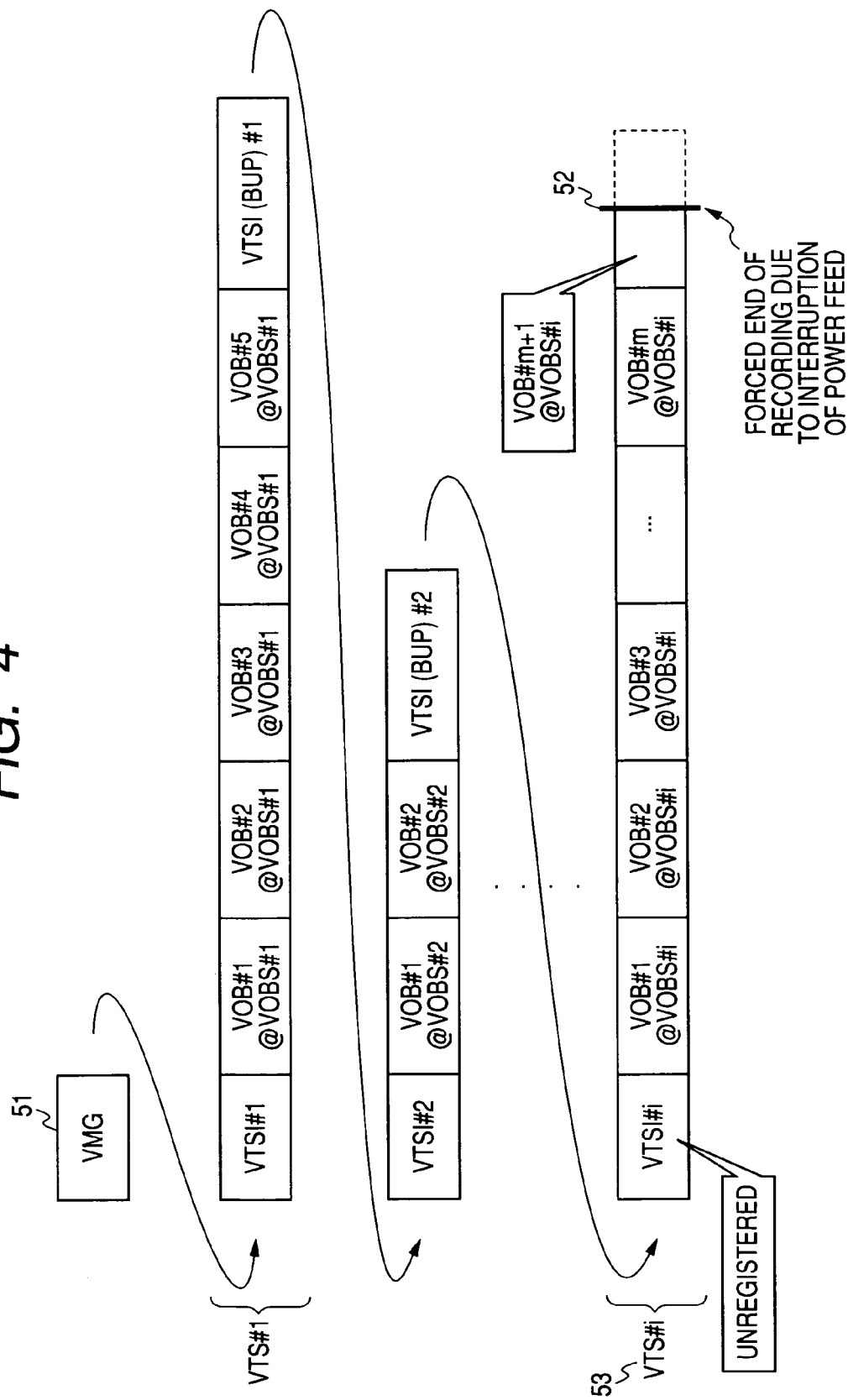
FIG. 4 is a diagram of a sequence of operation steps implemented by the recording apparatus in FIG. 3.

The recording apparatus 1 operates as follows. With reference to FIG. 4, the recording apparatus 1 secures a data region for a VMG 51 in the DVD 114. This step corresponds to the preparations for writing management information related to the whole of recorded data at an end of a data recording procedure after the completion of the recording of all desired contents data (all VTSs) on the DVD 114. Next, the recording apparatus 1 secures a data region for VTSI#1 in the DVD 114. This step corresponds to the preparations for recording the VTSI#1, that is, management information concerning a VTS#1. Thereafter, the recording apparatus 1 sequentially records VOB#1-VOB#5@VOBS#1 on the DVD 114. Subsequently, the recording apparatus 1 records management information concerning the VOBS#1 on the previously-secured data region for the VTSI#1 and also on a VTSI(BUP)#1 zone in the DVD 114. The recording apparatus 1 performs the above-mentioned operation steps for each of later VTSs. In this way, the recording apparatus 1 successively records one or more VTSs on the DVD 114.

It is assumed that the power feed to the recording apparatus 1 is interrupted and the recording operation thereof is forced to end at a timing 52 during the recording of a VTS#i 53 on the DVD 114, specifically, during the recording of a VOB#m+1@VOBS#i on the DVD 114. In this case, the recording of management information concerning a VTS#i on a VTSI#i zone in the DVD 114 has not been completed yet although VOB#1-VOB#m@VOBS#i and also a portion of the VOB#m+1@VOBS#i have been recorded on the DVD 114. The recording apparatus 1 enables the recorded VOB#1-VOB#m@VOBS#i and also the recorded portion of the VOB#m+1@VOBS#i to be reproduced by a reproducing apparatus (a DVD player).

Figure 5:
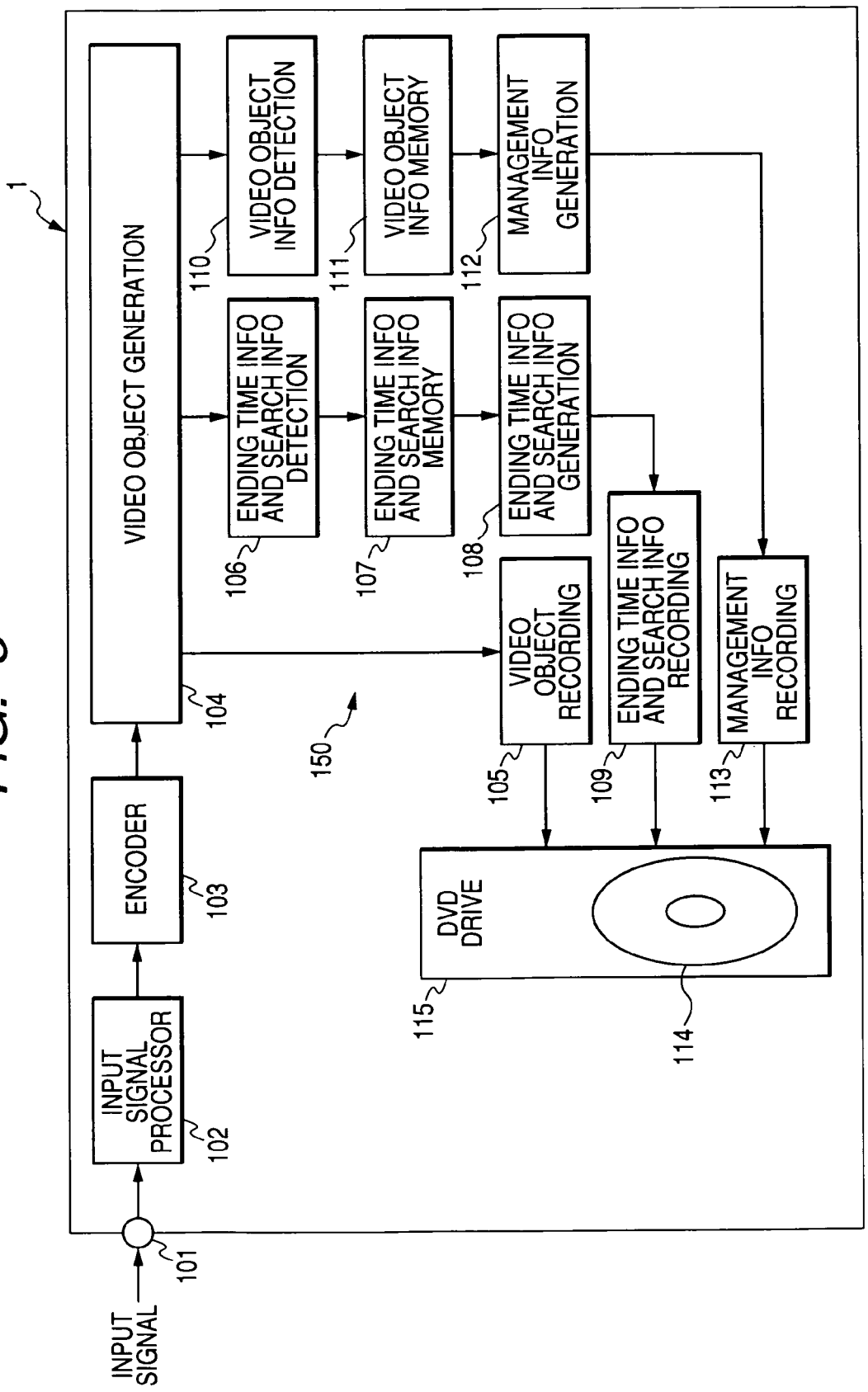
FIG. 5 is a diagram of the recording apparatus in FIG. 3.

As shown in FIGS. 3 and 5, the recording apparatus 1 includes an input signal processor 102, an encoder 103, a recording signal processor 150, and a DVD drive device 115 for the rewritable disc 114 which are sequentially connected in that order. The recording apparatus 1 further includes a controller 160 connected with the devices 102, 103, 115, and 150. The controller 160 serves to control the devices 102, 103, 115, and 150. The rewritable disc 114 can be placed into and removed from the DVD drive device 115.

An external device (not shown) feeds an input signal to the input signal processor 102 via an input terminal 101. The input signal is a video signal, an audio signal, or an audio-visual signal. For example, the input signal has a set of an analog composite video signal and an analog stereophonic audio signal.

The input signal processor 102 is controlled by the controller 160 to subject the input signal to format conversion including analog-to-digital conversion. Thereby, the input signal processor 102 converts the input signal into a digital signal. The input signal processor 102 outputs the digital signal to the encoder 103. For example, in the case where the input signal has a set of an analog composite video signal and an analog stereophonic audio signal, the input signal processor 102 converts the analog composite video signal and the analog stereophonic audio signal into digital color-difference data and digital audio data.

The encoder 103 converts the output signal of the input signal processor 102 into a data stream (a program stream) through an encoding procedure while being controlled by the controller 160. The encoder 103 outputs the data stream to the recording signal processor 150. For example, in the case where the output signal of the input signal processor 102 has a set of digital color-difference data and digital audio data, the encoder 103 subjects the digital color-difference data to MPEG2 encoding to get MEG2 video data and subjects the digital audio data to AC-3 encoding to get AC-3 audio data. Then, the encoder 103 combines the MEG video data and the AC-3 audio data into a program stream.

The recording signal processor 150 receives the program stream (the data stream) from the encoder 103. The recording signal processor 150 is controlled by the controller 160 to convert the program stream into a signal to be recorded which has a format equal to that in FIG. 1. The recording signal processor 150 outputs the signal to be recorded to the DVD drive device 115. The recording signal processor 150 controls the DVD drive device 115 in response to commands from the controller 160. The DVD drive device 115 records the output signal of the recording signal processor 150 on the rewritable disc 114 therein while being controlled by the recording signal processor 150 and the controller 160.

The input signal processor 102, the encoder 103, the recording signal processor 150, and the DVD drive device 115 are designed to implement real-time signal processing. Accordingly, a delay between the input signal fed to the input signal processor 102 and the signal recorded on the rewritable disc 114 is so small that substantially real-time recording can be implemented.

The recording signal processor 150 and the controller 160 include a digital signal processor, a microcomputer, or a similar device having a combination of an input/output port, a processing section, a ROM, and a RAM. The recording signal processor 150 and the controller 160 operate in accordance with a control program (a computer program) stored in the ROM or the RAM. The control program is designed to enable the recording signal processor 150 and the controller 160 to execute operation steps indicated hereafter.

It should be noted that the recording signal processor 150 and the controller 160 may be signal processing and control portions of a personal computer. In this case, the DVD drive device 115 uses one mounted on the personal computer.

FIG. 5 shows a flow of operation of the recording signal processor 150 rather than the hardware structure thereof. With reference to FIG. 5, there are blocks in the recording signal processor 150. The blocks will be described below.

A video object generating block 104 in the recording signal processor 150 processes the program stream outputted from the encoder 103. Specifically, the video object generating block 104 produces a VOBS (video object set) from the program stream while generating VOBUs (video object units) in response to the program stream and combining the generated VOBUs into VOBs (video objects). Each of the VOBUs has an empty navigation portion, an occupied navigation portion (that is, a navigation portion occupied by playback management information), and occupied data portions (that is, portions occupied by the video data and the audio data). The video object generating block 104 transmits the produced VOBS to a video object recording block 105 on a VOBU-by-VOBU basis.

The video object recording block 105 passes the VOBS from the video object generating block 104 to the DVD drive device 115. At the same time, the video object recording block 105 controls the DVD drive device 115 to sequentially record the VOBUs, transmitted from the video object generating block 104, on the rewritable disc 114. At this time, since each of the VOBUs has an empty navigation portion, a recording area on the rewritable disc 114 is formed with empty navigation zones.

The signal processing by the video object generating block 104 and the video object recording block 105 is in a real-time fashion. The VOBUs are sequentially transmitted from the video object generating block 104 to the rewritable disc 114 without being buffered. Thus, substantially real-time recording can be implemented.

The video object generating block 104 passes the program steam from the encoder 103 to an ending time information and search information detecting block 106 in the recording signal processor 150. The ending time information and search information detecting block 106 extracts search information (VOBU search information) from the program stream transmitted through the video object generating block 104. In addition, the ending time information and search information detecting block 106 gets ending time information (VOB video display ending time information) from the program stream. An ending time information and search information memory block 107 temporarily stores the ending time information and the search information provided by the ending time information and search information detecting block 106.

After each VOB is recorded on the rewritable disc 114 from the video object recording block 105 through the DVD drive device 115, an ending time information and search information generating block 108 produces navigation information from the ending time information and the search information stored by the ending time information and search information memory block 107. The produced navigation information includes the ending time information and the search information. The ending time information and search information generating block 108 transmits the produced navigation information to an ending time information and search information recording block 109.

The ending time information and search information recording block 109 passes the navigation information from the ending time information and search information generating block 108 to the DVD drive device 115. At the same time, the ending time information and search information recording block 109 controls the DVD drive device 115 to record or write the navigation information over the empty navigation zones in the rewritable disc 114.

A video object information detecting block 110 in the recording signal processor 150 extracts video object information from the VOBS produced by the video object generating block 104. The video object information is composed of time information, address information, and discontinuous point information. A video object information memory block 111 temporarily stores the video object information provided by the video object information detecting block 110.

A management information generating block 112 produces VTSI (video title set information) and VTSI(BUP) from the video object information stored by the video object information memory block 111. The management information generating block 112 transmits the produced VTSI and VTSI(BUP) to a management information recording block 113.

The management information recording block 113 passes the VTSI and the VTSI(BUP) from the management information generating block 112 to the DVD drive device 115. At the same time, the management information recording block 113 controls the DVD drive device 115 to record the VTSI and the VTSI(BUP) on prescribed places, that is, a VTSI zone 83 and a VTSI(BUP) zone 85, in the rewritable disc 114. In this way, one VTS (video title set) is recorded on the rewritable disc 114.

Figure 6:
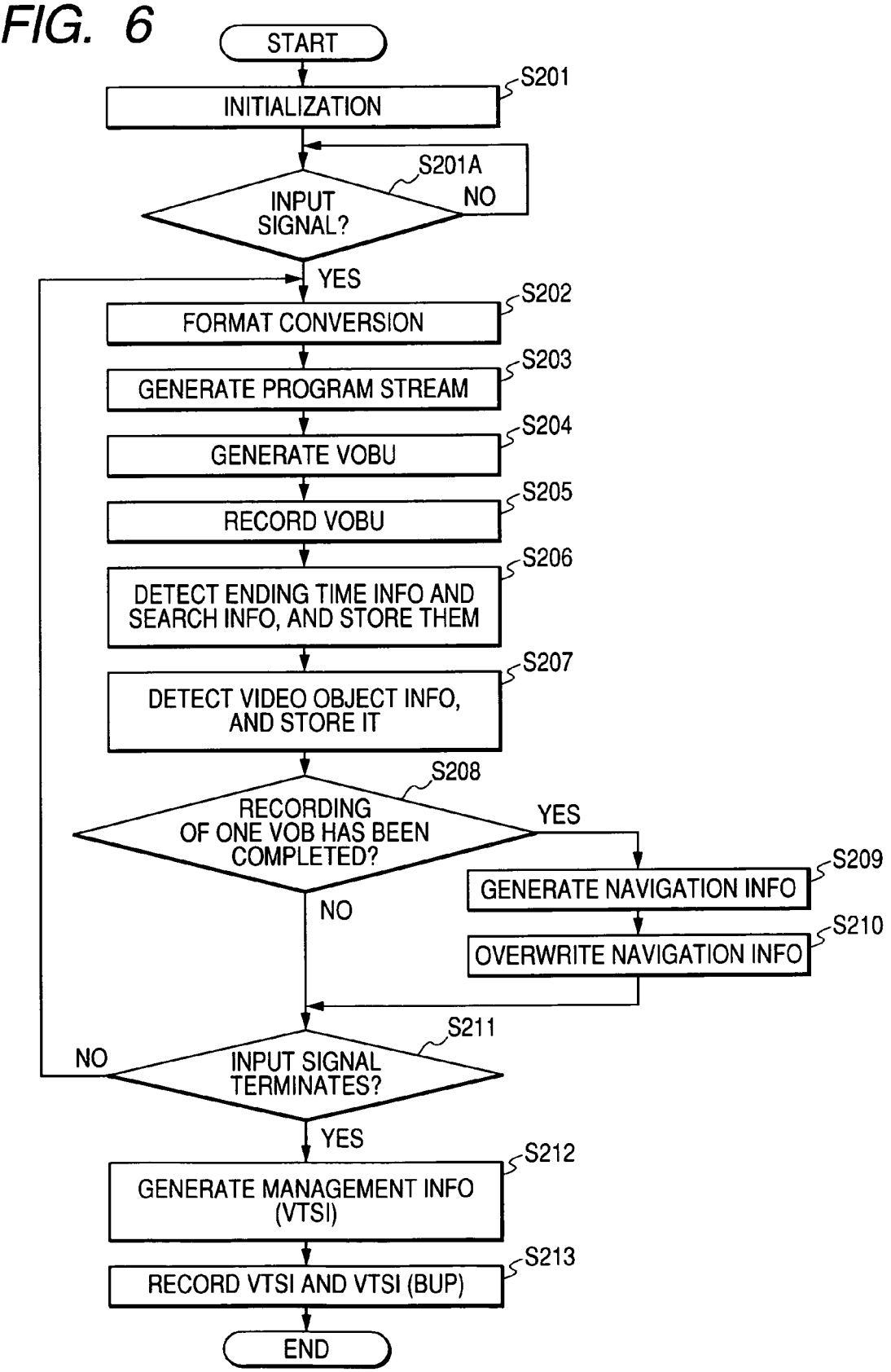
FIG. 6 is a flowchart of a segment of a control program for a recording signal processor and a controller in FIG. 3.

As previously mentioned, the recording signal processor 150 and the controller 160 operate in accordance with the control program stored in the internal ROM or the internal RAM. FIG. 6 is a flowchart of a segment of the control program for recording one VTS inclusive of a VOBS on the rewritable disc 114. The program segment is started when the rewritable disc 114 having an unoccupied recording area (a usable recording area) is placed in the DVD drive device 115.

As shown in FIG. 6, a first step S201 of the program segment executes initialization. Specifically, the step S201 controls the DVD drive device 115 to secure a recording region on the rewritable disc 114 for a VMG (video manager). In addition, the step S201 controls the DVD drive device 115 to secure a recording region on the rewritable disc 114 for VTSI (video title set information). Accordingly, the step S201 decides an on-disc recording start point for a first VOB. After the step S201, the program advances to a step S201A.

The step S201A accesses the input signal processor 102 to determine whether or not an input signal comes thereto. When an input signal comes to the input signal processor 102, the program advances from the step S201A to a step S202. Otherwise, the step S201A is repeated. Thus, a stand-by state is continued until an input signal comes to the input signal processor 102.

It is assumed that the input signal has a set of an analog video signal and an analog audio signal, for example, an analog composite video signal and an analog stereophonic audio signal.

The step S202 controls the input signal processor 102 to subject the input signal to format conversion including analog-to-digital conversion. Thereby, the input signal is converted into a digital signal of a prescribed format suitable to be processed by the encoder 103. The digital signal is transmitted from the input signal processor 102 to the encoder 103.

A step S203 following the step S202 controls the encoder 103 to encode video components of the digital signal in conformity with the MPEG2 standards to get encoded video data. In addition, the step S203 controls the encoder 103 to encode audio components of the digital signal in conformity with the PCM standards, the Dolby AC-3 standards, or the MPEG Audio standards to get encoded audio data. Furthermore, the step S203 controls the encoder 103 to combine the encoded video data and the encoded audio data into a program stream (a data stream). The program stream is transmitted from the encoder 103 to the recording signal processor 150.

A step S204 subsequent to the step S203 generates a VOBU (video object unit) in response to the program stream. The generated VOBU has an empty navigation portion, an occupied navigation portion (that is, a navigation portion occupied by playback management information), and occupied data portions (that is, portions occupied by the video data and the audio data).

A step S205 following the step S204 controls the DVD drive device 115 to record the VOBU generated by the step S204 on the rewritable disc 114 from the on-disc recording start point without buffering the VOBU. Then, the step S205 updates the on-disc recording start point. Since the VOBU has an empty navigation portion, the recording area on the rewritable disc 114 is formed with an empty navigation zone.

A step S206 subsequent to the step S205 extracts, from the program stream, time information which should be assigned to navigation information in a final VOBU in a current VOB. The extracted time information is defined as ending time information (VOB video display ending time information). In addition, the step S206 extracts navigation-related address information from the program stream. The extracted address information is defined as search information (VOBU search information). The step S206 writes the ending time information and the search information into the RAM within the recording signal processor 150 or the controller 160.

A step S207 following the step S206 extracts video object information from a current VOBS, that is, from the playback management information in the VOBU generated by the step S204. The extracted video object information is composed of time information, address information, and discontinuous point information. The step S207 writes the video object information into the RAM within the recording signal processor 150 or the controller 160.

A step S208 subsequent to the step S207 decide whether or not the recording of the current VOB on the rewritable disc 114 has been completed. When the recording of the current VOB has been completed, the program advances from the step S208 to a step S209. Otherwise, the program advances from the step S208 to a step S211.

The step S209 reads out all the ending time information and the search information for the current VOB from the RAM within the recording signal processor 150 or the controller 160. In other words, the step S209 retrieves all the ending time information and the search information for the current VOB. The step S209 generates navigation information pieces inclusive of the retrieved ending time information and the retrieved search information.

A step S210 following the step S209 controls the DVD drive device 115 to record or write the navigation information pieces generated by the step S209 over the empty navigation zones in the recording area on the rewritable disc 114 for the current VOB. After the step S210, the program advances to the step S211.

The step S211 accesses the input signal processor 102 to decide whether or not the input signal is being fed thereto, that is, whether or not the input signal terminates. When the input signal is being fed to the input signal processor 102, the program returns from the step S211 to the step S202. On the other hand, when the input signal terminates, the program advances from the step S211 to a step S212.

The step S212 reads out the video object information for all the VOBs in the present VTS from the RAM within the recording signal processor 150 or the controller 160. In other words, the step S212 retrieves the video object information for all the VOBs in the present VTS. The step S212 generates VTSI and VTSI(BUP) for the VOBS of the present VTS from the retrieved video object information.

A step S213 subsequent to the step S212 controls the DVD drive device 1 15 to record the VTSI generated by the step S212 on the VTSI recording region in the rewritable disc 114 which is secured by the step S201. In addition, the step S213 controls the DVD drive device 115 to record the VTSI(BUP) on a portion of the rewritable disc 114 which immediately follows the place of the last recorded VOB. After the step S213, the current execution cycle of the program segment ends.

Figure 7:
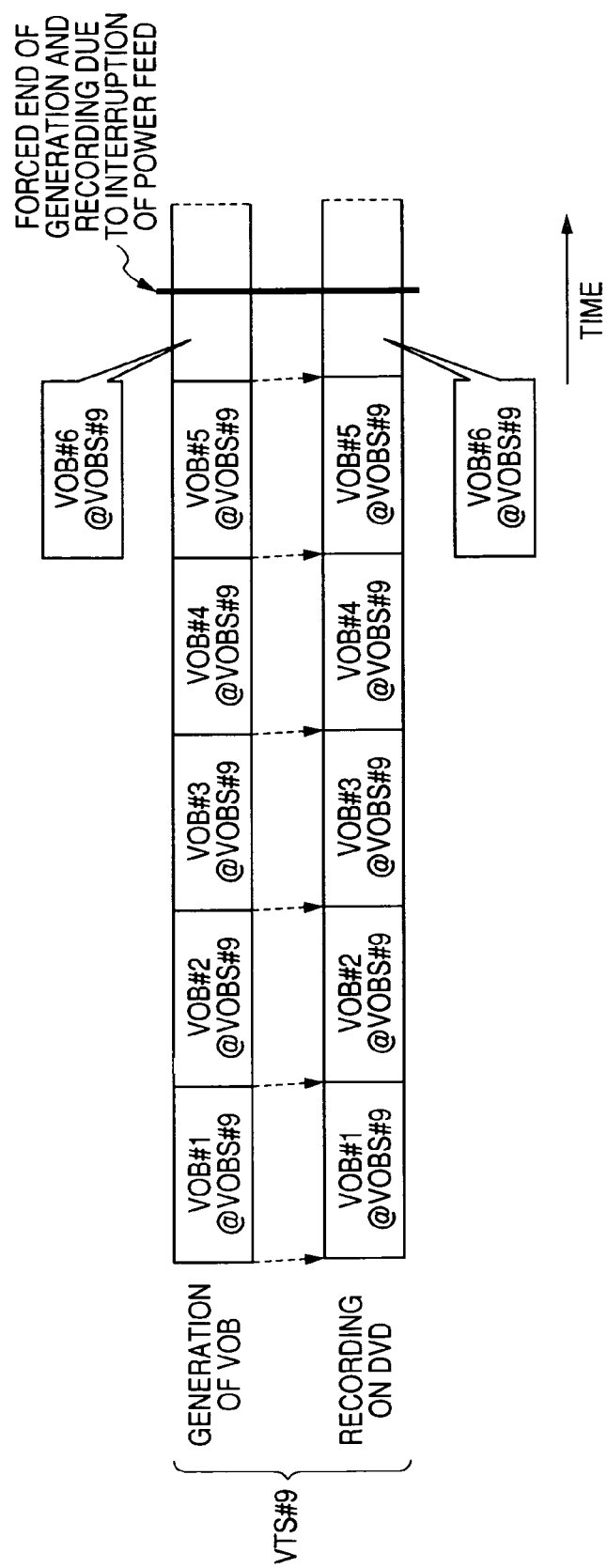
FIG. 7 is a time-domain diagram of timings of generating VOBs and timings of recording VOBs on a DVD in the recording apparatus of FIG. 3.

As shown in FIG. 7, a delay between the generation of each VOB and the recording of the VOB on the rewritable disc 114 is remarkably shorter than a 1-VOB-corresponding time interval. Each VOB void of search information and ending time information is recorded on the rewritable disc 114 in real time with respect to the input signal fed to the input signal processor 102. After the recording of each VOB has been completed, search information and ending time information are recorded or written over corresponding empty zones in the rewritable disc 114.

With reference to FIG. 7, it is assumed that the recording operation of the recording apparatus 1 is forced to end due to the occurrence of a problem such as an interruption of the power feed thereto during the generation and recording of a VOB#6@VOBS#9 in a VTS#9. In this case, as shown in FIG. 7, the whole of a VOB#5@VOBS#9 and a portion of the VOB#6@VOBS#9 have been recorded on the rewritable disc 114 at the moment of the forced end of the recording operation. On the other hand, in the prior-art case of FIG. 2, a portion of the VOB#5@VOBS#9 and the whole of the VOB#6@VOBS#9 fail to be recorded on a rewritable disc. Accordingly, the amount of successfully recorded data is remarkably greater than that in the prior-art case of FIG. 2. Provided that VTSI#9 and VTSI(BUP)#9 are restored by a prior-art technology, it is possible to reproduce the whole of the VOB#5@VOBS#9 and the recorded portion of the VOB#6@VOBS#9 from the rewritable disc 114.

Figure 8:
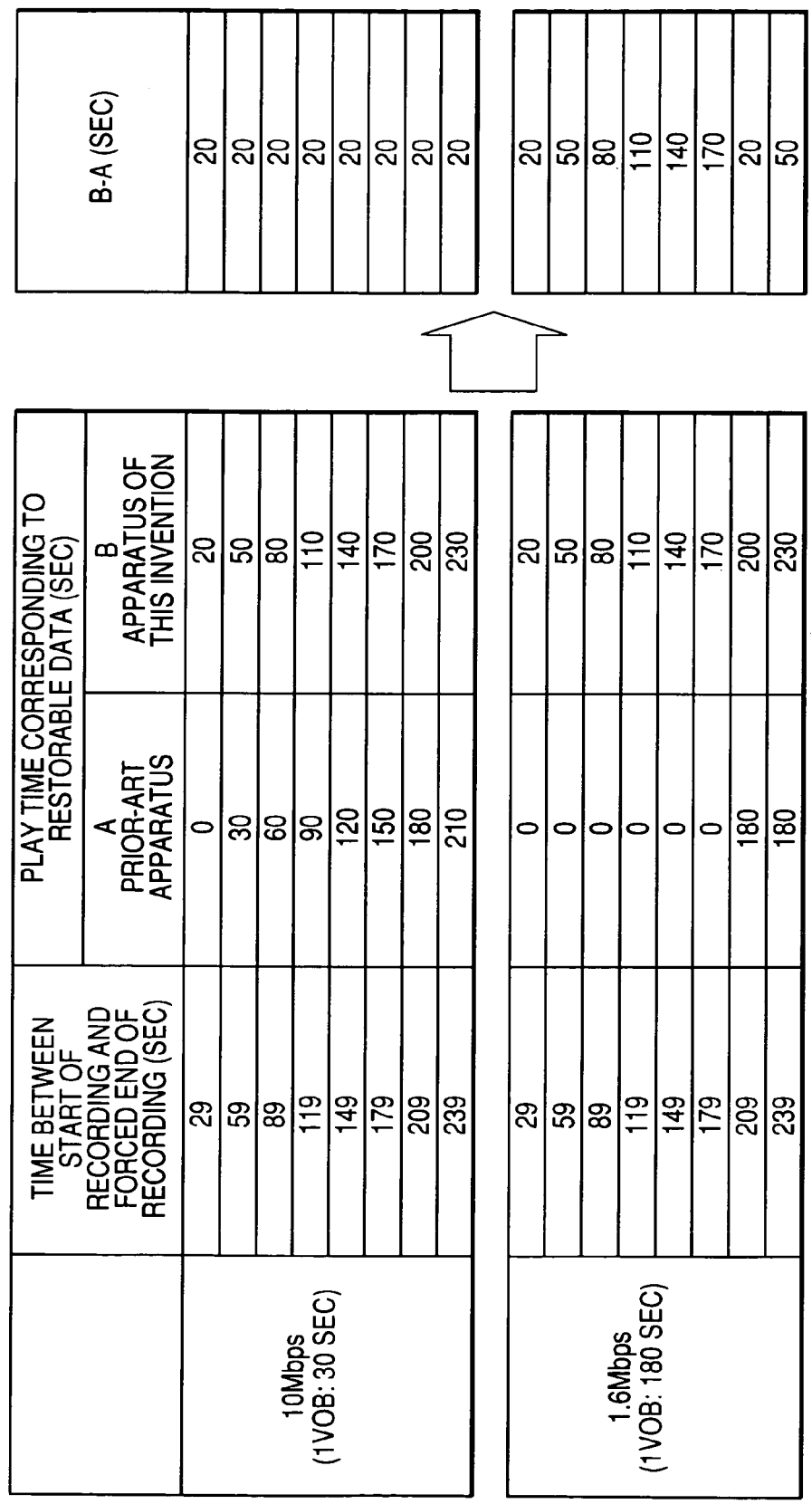
FIG. 8 is a table showing the relation among (1) the bit rate at which input contents data is encoded before being recorded on a rewritable disc, (2) the time interval between the moment of start of recording operation and the moment of forced end of the recording operation, and (3) the play time corresponding to contents data which can be reproduced from the rewritable disc in regard to each of the recording apparatus of FIG. 3 and a prior-art recording apparatus.

FIG. 8 shows the relation among (1) the bit rate at which input contents data is encoded before being recorded on a rewritable disc, (2) the time interval between the moment of start of recording operation and the moment of forced end of the recording operation, and (3) the play time corresponding to contents data which can be reproduced from the rewritable disc in regard to each of the recording apparatus 1 and a prior-art recording apparatus. At a bit rate of 10 Mbps, one VOB corresponds to a play time of about 30 seconds. With reference to FIG. 8, in the case of a bit rate of 10 Mbps, the play time corresponding to contents data which can be reproduced from a rewritable disc in regard to the recording apparatus 1 is longer than that in regard to the prior-art apparatus by about 20 seconds. At a bit rate of 1.6 Mbps, one VOB corresponds to a play time of about 180 seconds. With reference to FIG. 8, in the case of a bit rate of 1.6 Mbps, the play time corresponding to contents data which can be reproduced from a rewritable disc in regard to the recording apparatus 1 is longer than that in regard to the prior-art apparatus by about 170 seconds or shorter. Accordingly, the recording apparatus 1 is greatly advantageous over the prior-art apparatus when the bit rate is relatively low.

While a prior-art apparatus causes a recording delay corresponding to one VOB, the recording apparatus 1 does not cause such a recording delay. Therefore, the recording apparatus 1 has higher real-time recording performances. As previously mentioned, in the event that the recording operation of the recording apparatus 1 is forced to end, a greater amount of contents data can be recorded on a DVD in comparison with a prior-art design. Thus, a greater amount of contents data can be reproduced from the DVD thereafter. As shown in FIG. 8, the play time corresponding to contents data which can be reproduced from a rewritable disc in regard to the recording apparatus 1 is longer than that in regard to a prior-art apparatus by, for example, several tens of seconds.

It should be noted that the rewritable disc 114 and the DVD drive device 115 may be replaced by a hard disc and a drive device therefor, or another rewritable recording medium and a drive device therefor.

SECOND EMBODIMENT

Figure 9:
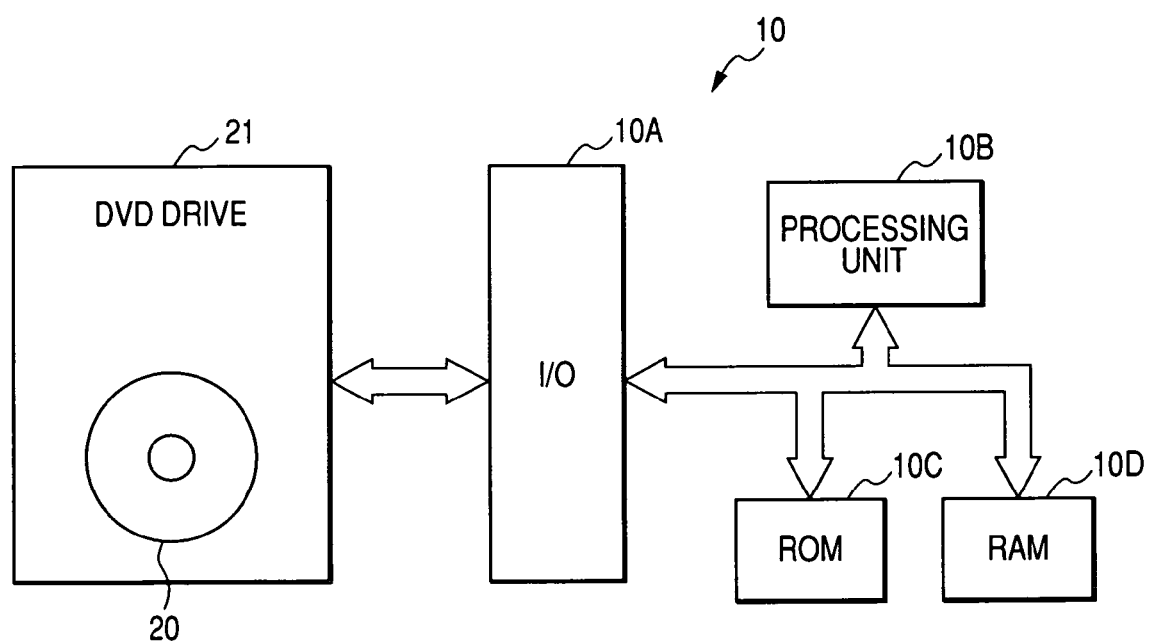
FIG. 9 is a block diagram of a data restoring apparatus according to a second embodiment of this invention.

FIG. 9 shows an apparatus 10 for restoring data recorded on a write-once disc 20 such as a write-once DVD. The data restoring apparatus 10 is connected with a disc drive device 21 for the write-once disc 20. The data restoring apparatus 10 can control the disc drive device 21. The data restoring apparatus 10 and the disc drive device 21 can communicate with each other. The write-once disc 20 can be placed into and removed from the disc drive device 21. The write-once disc 20 stores data of the same structure as that in FIG. 1 or FIG. 4.

As shown in FIG. 9, the data restoring apparatus 10 includes an input/output port 10A, a processing unit 10B, a ROM 10C, and a RAM 10D which are connected to form a computer system. The ROM 10C or the RAM 10D stores a control program (a computer program) for the computer system. The data restoring apparatus 10 operates in accordance with the control program. The control program is designed to enable the data restoring apparatus 10 to execute operation steps indicated hereafter.

Figure 10:
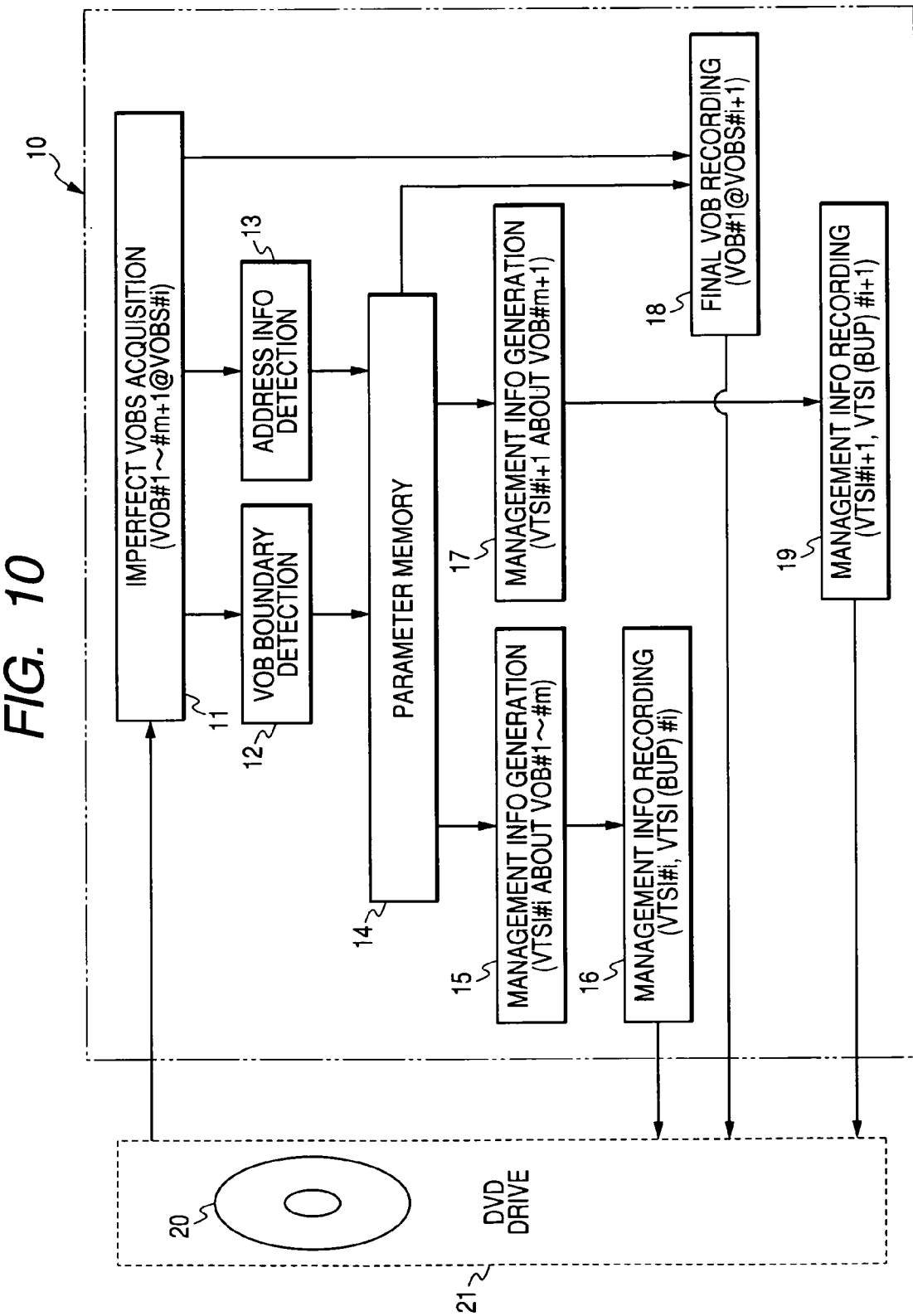
FIG. 10 is a diagram of the data restoring apparatus in FIG. 9.

FIG. 10 shows a flow of operation of the data restoring apparatus 10 rather than the hardware structure thereof. With reference to FIG. 10, there are blocks in the data restoring apparatus 10. The blocks will be described below.

It is assumed that the write-once disc 20 stores a VTS#i 53 of an imperfect data structure which has a VOBS#i composed of VOB#1-VOB#m+1@VOBS#i, and that the VOB#1-VOB#m@VOBS#i normally have data while the final VOB (the VOB#m+1@VOBS#i) is short of data due to forced end of operation of a recording apparatus (see FIG. 4). The VOBS#i is referred to as an imperfect VOBS. An imperfect VOBS acquiring block 11 in the data restoring apparatus 10 accesses the write-once disc 20 via the disc drive device 21 and reads out the VOBS#i in the VTS#i therefrom. As previously indicated, the VOBS#i is composed of VOB#1-VOB#m+1@VOBS#i.

A VOB boundary detecting block 12 receives the VOBS#i from the imperfect VOBS acquiring block 11. The VOB boundary detecting block 12 extracts VOB identifier information from navigation information in each of VOBs composing the VOBS#i. It should be noted that the VOBS#i may have only one VOB. The VOB boundary detecting block 12 detects or gets boundary value information about the VOBs in the VOBS#i on the basis of the extracted VOB identifier information.

An address information detecting block 13 receives the VOBS#i from the imperfect VOBS acquiring block 11. The address information detecting block 13 detects address information in the navigation information in each of the VOBs in the VOBS#i.

A parameter memory block 14 receives the boundary value information detected by the VOB boundary detecting block 12 and the address information detected by the address information detecting block 13. The parameter memory block 14 stores the boundary value information and the address information as parameter information.

A management information generating block 15 accesses the parameter memory block 14 to read out the parameter information, that is, the boundary value information and the address information therefrom. On the basis of the boundary value information and the address information, the management information generating block 15 produces management information concerning the VOB#1-VOB#m@VOBS#i which normally have data.

A management information recording block 16 sends the produced management information concerning the VOB#1-VOB#m@VOBS#i from the management information generating block 15 to the disc drive device 21. The management information recording block 16 controls the disc drive device 21 to record the management information concerning the VOB#1-VOB#m@VOBS#i on the VTSI#i zone in the write-once disc 20. In addition, the management information recording block 16 controls the disc drive device 21 to record the management information concerning the VOB#1-VOB#m@VOBS#i on the write-once disc 20 as VTSI(BUP)#i. Thus, backup data for the management information concerning the VOB#1-VOB#m@VOBS#i is recorded on the write-once disc 20 as VTSI(BUP)#i.

A management information generating block 17 accesses the parameter memory block 14 to read out the parameter information, that is, the boundary value information and the address information therefrom. On the basis of the boundary value information and the address information, the management information generating block 17 produces management information concerning the VOB#m+1@VOBS#i which is short of data. The produced management information is defined as management information for a new VOB (a new VOB#1@VOBS#i+1).

A final VOB recording block 18 receives, from the imperfect VOBS acquiring block 11, the VOB#m+1@VOBS#i (the final VOB) which is short of data. The final VOB recording block 18 accesses the parameter memory block 14 to read out the boundary value information and the address information therefrom which concern the VOB#1-VOB#m+1@VOBS#i. The final VOB recording block 18 corrects the navigation information in the VOB#m+1@VOBS#i in response to the boundary value information and the address information, and thereby changes the VOB#m+1@VOBS#i into a new VOB#1@VOBS#i+1 (a first VOB in a new VOBS). The final VOB recording block 18 sends the VOB#1@VOBS#i+1 to the disc drive device 21. The final VOB recording block 18 controls the disc drive device 21 to record the VOB#1@VOBS#i+1 on the write-once disc 20 as a portion of a new VTS#i+1.

It should be noted that the final VOB recording block 18 may correct the navigation information in the VOB#m+1@VOBS#i in response to the management information concerning the VOB#m+1@VOBS#i instead of the boundary value information and the address information read from the parameter memory block 14. In this case, the final VOB recording block 18 receives the management information concerning the VOB#m+1@VOBS#i from the management information generating block 17.

A management information recording block 19 sends the produced management information concerning the VOB#1@VOBS#i+1 from the management information generating block 17 to the disc drive device 21. The management information recording block 19 controls the disc drive device 21 to record the management information concerning the VOB#1@VOBS#i+1 on the write-once disc 20 as VTSI#i+1 and VTSI(BUP)#i+1.

In this way, the data restoring apparatus 10 corrects the imperfect VTS on the write-once disc 20 into perfect VTSs thereon. Thus, the data restoring apparatus 10 enables video and audio data in the imperfect VTS to be reproduced by a DVD player. Accordingly, the correction of the imperfect VTS into the perfect VTSs means the restoration of data recorded on the write-once disc 20.

It should be noted that the data restoring apparatus 10 may be signal processing and control portions of a DVD recording and reproducing apparatus or a DVD reproducing apparatus (a DVD player). Alternatively, the data restoring apparatus 10 may be signal processing and control portions of a personal computer. In this case, the disc drive device 21 uses one mounted on the personal computer.

Figure 11:
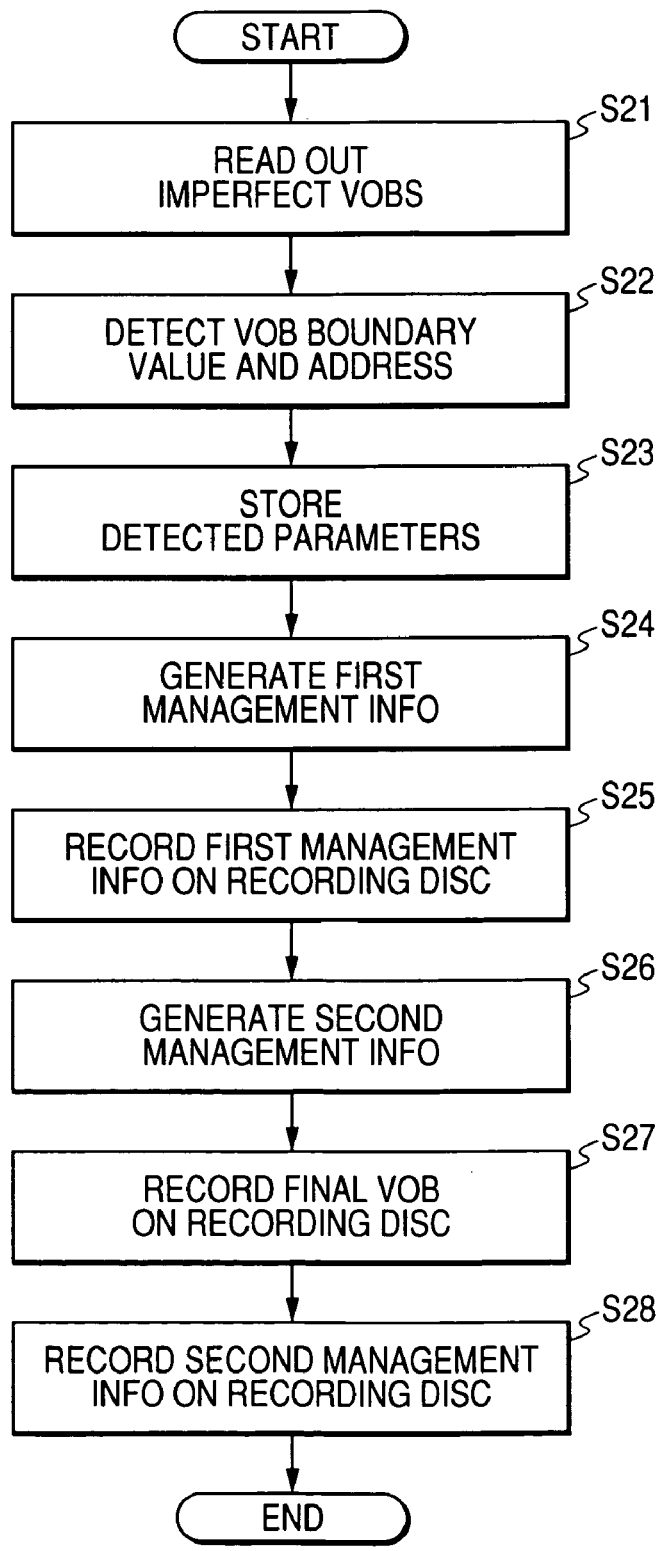
FIG. 11 is a flowchart of a segment of a control program for the data restoring apparatus in FIG. 9.

As previously mentioned, the data restoring apparatus 10 operates in accordance with the control program stored in the internal ROM 10C or the internal RAM 10D. FIG. 11 is a flowchart of a segment of the control program for restoring on-disc data. The program segment is started when a write-once disc 20 is placed in the disc drive device 21.

With reference to FIG. 11, a first step S21 of the program segment controls the disc drive device 21 to scan the write-once disc 20 in the direction from its inner circumferential edge toward its outer circumferential edge. During the scanning of the write-once disc 20, the step S21 checks VTSI in each VTS to search recorded data for an imperfect VOBS about which recorded VTSI and VTSI(BUP) are absent. The step S21 controls the disc drive device 21 to sequentially read out VOBs (VOB#1-VOB#m+1@VOBS#i in FIG. 4) in such an imperfect VOBS from the write-once disc 20.

A step S22 following the step S21 detects VOB identifier information in navigation information in each of the VOBs composing the imperfect VOBS. The step S22 gets boundary value information about the VOBs in the imperfect VOBS on the basis of the detected VOB identifier information. In addition, the step S22 extracts VOB start address information from the navigation information in each of the VOBs composing the imperfect VOBS.

A step S23 subsequent to the step S22 stores the boundary value information and the address information (the VOB start address information) for each VOB into the RAM 10D.

A step S24 following the step S23 reads out, from the RAM 10D, the boundary value information and the address information for the VOBs composing the imperfect VOBS. On the basis of the boundary value information and the address information, the step S24 produces first management information (first video title set information or first VTSI) concerning the VOB#1-VOB#m@VOBS#i which normally have data. The first management information conforms to the DVD-Video standards.

A step S25 subsequent to the step S24 controls the disc drive device 21 to record the first management information concerning the VOB#1-VOB#m@VOBS#i on the VTSI#i zone in the write-once disc 20. In addition, the step S25 controls the disc drive device 21 to record the first management information concerning the VOB#1-VOB#m@VOBS#i on the write-once disc 20 as VTSI(BUP)#i. Thus, backup data for the first management information concerning the VOB#1-VOB#m@VOBS#i is recorded on the write-once disc 20 as VTSI(BUP)#1.

A step S26 following the step S25 accesses the RAM 10D to read out the boundary value information and the address information therefrom which concern the VOBs composing the imperfect VOBS. On the basis of the boundary value information and the address information, the step S26 produces second management information (second video tile set information or second VTSI) concerning the VOB#m+1@VOBS#i which is short of data. The second management information conforms to the DVD-Video standards, and is defined as management information for a new VOB (a new VOB#1@VOBS#i+1).

A step S27 subsequent to the step S26 accesses the RAM 10D to read out the boundary value information and the address information therefrom which concern the VOBs composing the imperfect VOBS. The step S27 corrects the navigation information (for example, the search information) in the final VOB, that is, the VOB#m+1@VOBS#i in response to the boundary value information and the address information, and thereby changes the VOB#m+1@VOBS#i into a new VOB#1@VOBS#i+1 (a first VOB in a new VOBS). The step S27 controls the disc drive device 21 to secure a VTSI#i+1 zone in the recording area of the write-once disc 20. Subsequently, the step S27 controls the disc drive device 21 to record the VOB#1@VOBS#i+1 on the write-once disc 20 as a portion of a new VTS#i+1.

It should be noted that the step S27 may correct the navigation information in the VOB#m+1@VOBS#i in response to the second management information produced by the step S26 instead of the boundary value information and the address information read out from the RAM 10D.

A step S28 following the step S27 controls the disc drive device 21 to record the second management information concerning the VOB#1@VOBS#i+1 on the VTSI#i+1 zone in the write-once disc 20. In addition, the step S28 controls the disc drive device 21 to record the management information concerning the VOB#1@VOBS#i+1 on the write-once disc 20 as VTSI(BUP)#i+1. Thus, backup data for the management information concerning the VOB#1@VOBS#i+1 is recorded on the write-once disc 20 as VTSI(BUP)#i+1. After the step S28, the current execution cycle of the program segment ends.

Figure 12:
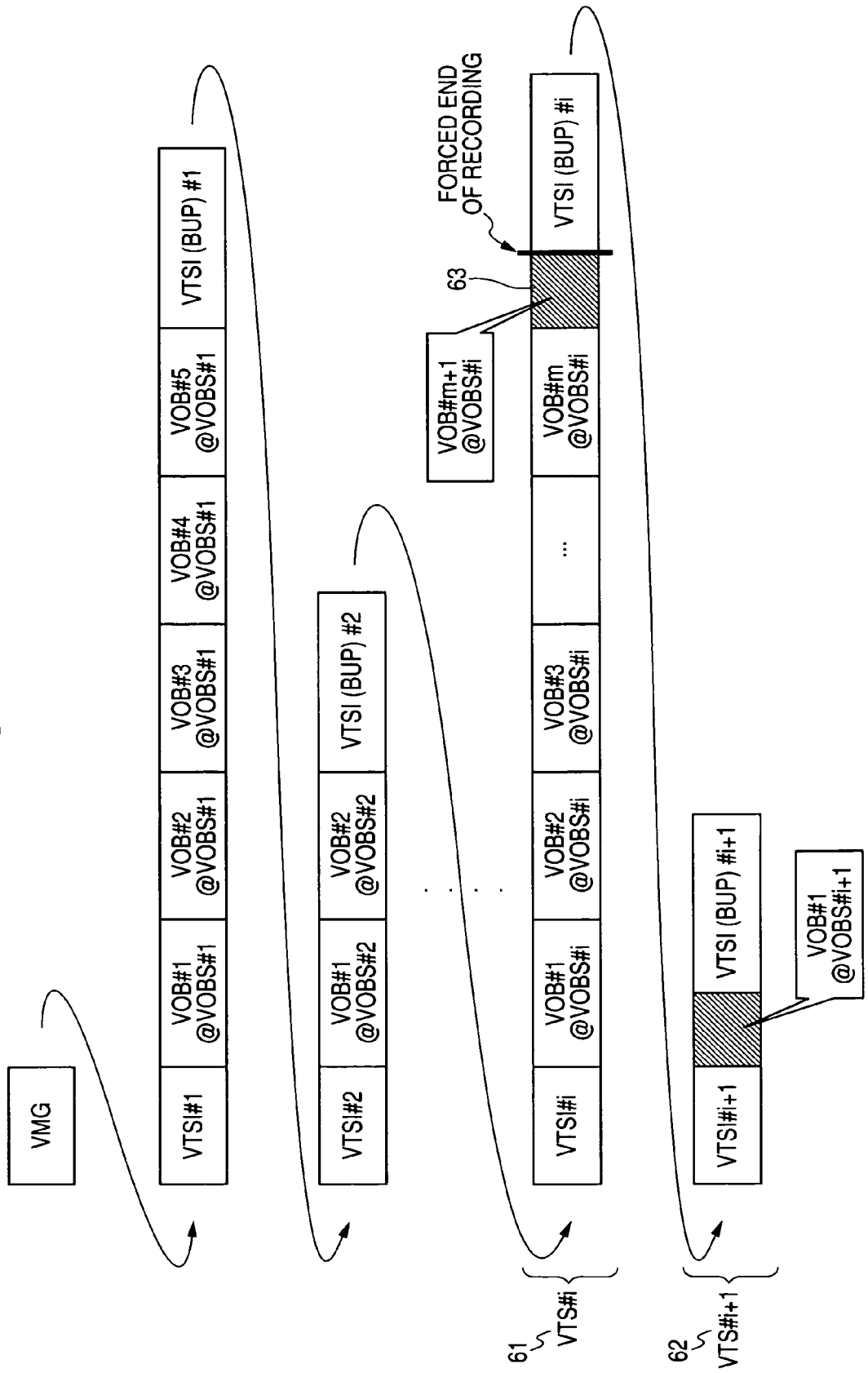
FIG. 12 is a diagram of a sequence of operation steps implemented by the data restoring apparatus in FIG. 9.

As a result of the execution of the steps S21-S28 in FIG. 11, the imperfect VTS recorded on the write-once disc 20 is corrected into perfect VTSs recorded thereon. Specifically, the VTSI#i and the VTSI(BUP)#i are made before being recorded on the write-once disc 20. Therefore, as shown in FIG. 12, the VTSI#i, the VOB#1-VOB#m@VOBS#i, and the VTSI(BUP)#i constitute a perfect VTS#i 61 recorded on the write-once disc 20. Thus, the VOB#1-VOB#m@VOBS#i can be normally reproduced from the write-once disc 20 by a DVD player. As shown in FIG. 12, the VTSI#i+1 and the VTSI(BUP)#i+1 are made before being recorded on the write-once disc 20. The VOB#m+1@VOBS#i 63 is set as a VOB#1@VOBS#i+1 in a new perfect VTS#i+1 62 recorded on the write-once disc 20 and including the VTSI#i+1 and the VTSI(BUP)#i+1. Thus, the contents of the VOB#m+1@VOBS#i can be normally reproduced from the write-once disc 20 by the DVD player. Accordingly, the correction of the imperfect VTS into the perfect VTSs means the restoration of data recorded on the write-once disc 20.

In the case where a point at which the recording operation is forced to end corresponds to a position within a VOBU in the VOB#m+1@VOBS#i 63 (see FIG. 12), the VOBU can not be restored and VOBUs up to one immediately preceding that VOBU (the unrestorable VOBU) can be set in the VOB#1@VOBS#i+1. Accordingly, in this case, the VOBUs up to one immediately preceding the unrestorable VOBU can be reproduced from the write-once disc 20 by the DVD player. After the data restoration, the VOB#m+1@VOBS#i 63 (see FIG. 12) recorded on the write-one disc 20 forms an ineffective region which can be not recognized.

Forced end of operation of a recording apparatus due to an interruption of the power feed thereto causes an imperfect VTS to be recorded on a write-once disc 20. As explained above, the data restoring apparatus 10 can correct the imperfect VTS into perfect VTSs recorded on the write-once disc 20. Thus, the data restoring apparatus 10 enables video and audio data in the imperfect VTS to be recognized and reproduced from the write-once disc 20 by a DVD player.

It should be noted that the steps S26, S27, and S28 may be omitted from FIG. 11. In this case, the contents of the VOB#m+1@VOBS#i can not be reproduced from the write-once disc 20 by a DVD player even after the data restoration.

It should be noted that the write-once disc 20 may be replaced by a rewritable disc such as a rewritable DVD.

THIRD EMBODIMENT

Figure 13:
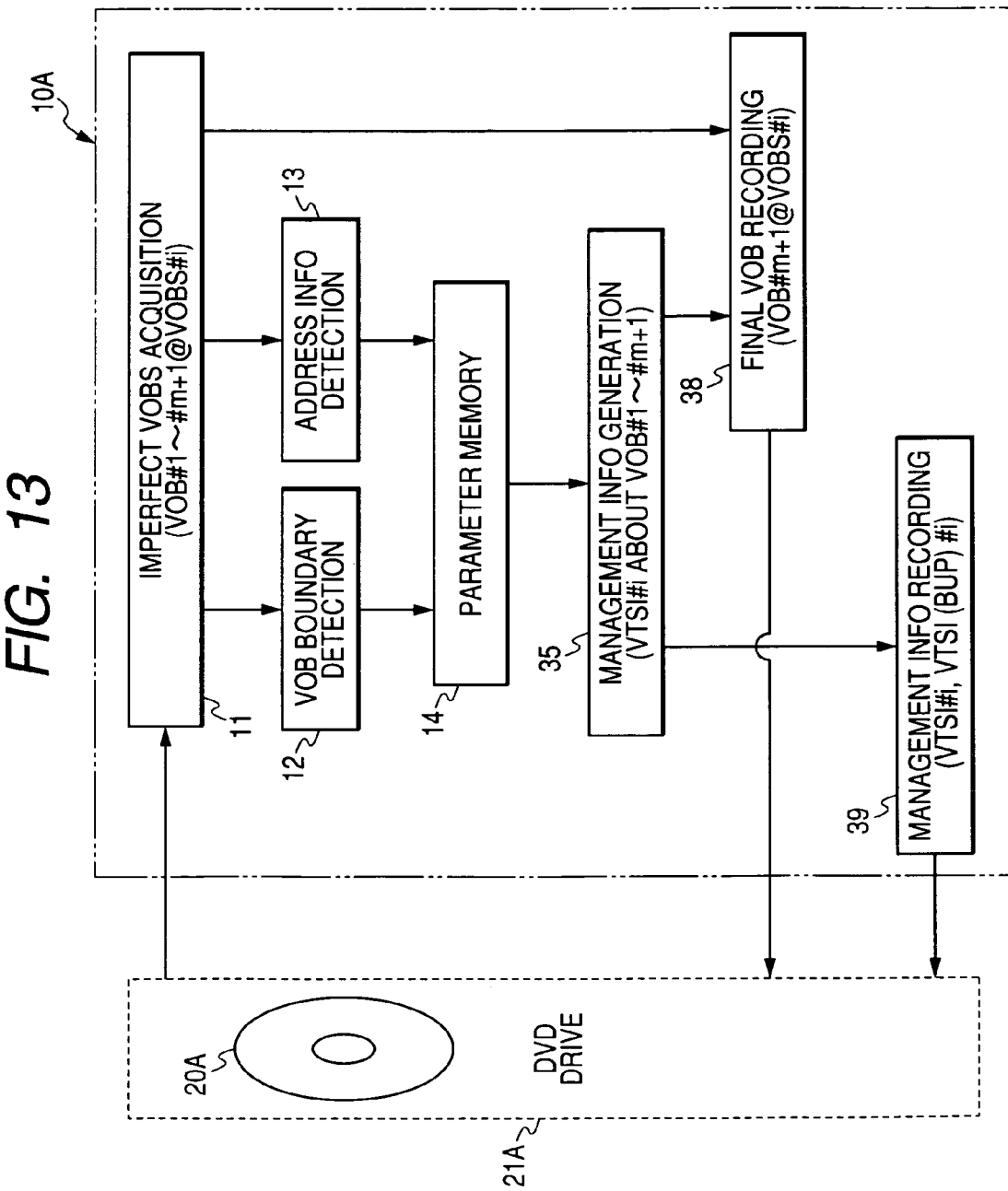
FIG. 13 is a diagram of a data restoring apparatus according to a third embodiment of this invention.

FIG. 13 shows an apparatus 10A for restoring data recorded on a rewritable disc 20A such as a rewritable DVD. The data restoring apparatus 10A is connected with a disc drive device 21A for the rewritable disc 20A. The data restoring apparatus 10A can control the disc drive device 21A. The data restoring apparatus 10A and the disc drive device 21A can communicate with each other. The rewritable disc 20A can be placed into and removed from the disc drive device 21A. The rewritable disc 20A stores data of the same structure as that in FIG. 1 or FIG. 4.

The data restoring apparatus 10A is similar to the data restoring apparatus 10 in FIGS. 9 and 10 except for design changes indicated hereafter.

FIG. 13 shows a flow of operation of the data restoring apparatus 10A rather than the hardware structure thereof. With reference to FIG. 13, there are blocks in the data restoring apparatus 10A. The blocks will be described below.

It is assumed that the rewritable disc 20A stores a VTS#i 53 of an imperfect data structure which has a VOBS#i composed of VOB#1-VOB#m+1@VOBS#i, and that the VOB#1-VOB#m@VOBS#i normally have data while the final VOB (the VOB#m+1@VOBS#i) is short of data due to forced end of operation of a recording apparatus (see FIG. 4). The VOBS#i is referred to as an imperfect VOBS. An imperfect VOBS acquiring block 11 in the data restoring apparatus 10A accesses the rewritable disc 20A via the disc drive device 21A and reads out the VOBS#i in the VTS#i therefrom. As previously indicated, the VOBS#i is composed of VOB#1-VOB#m+1@VOBS#i.

A VOB boundary detecting block 12 receives the VOBS#i from the imperfect VOBS acquiring block 11. The VOB boundary detecting block 12 extracts VOB identifier information from navigation information in each of VOBs composing the VOBS#i. It should be noted that the VOBS#i may have only one VOB. The VOB boundary detecting block 12 detects or gets boundary value information about the VOBs in the VOBS#i on the basis of the extracted VOB identifier information.

An address information detecting block 13 receives the VOBS#i from the imperfect VOBS acquiring block 11. The address information detecting block 13 detects address information in the navigation information in each of the VOBs in the VOBS#i.

A parameter memory block 14 receives the boundary value information detected by the VOB boundary detecting block 12 and the address information detected by the address information detecting block 13. The parameter memory block 14 stores the boundary value information and the address information as parameter information.

A management information generating block 35 accesses the parameter memory block 14 to read out the parameter information, that is, the boundary value information and the address information therefrom. On the basis of the boundary value information and the address information, the management information generating block 35 produces management information (video title set information or VTSI) concerning the VOB#1-VOB#m+1@VOBS#i up to a data segment corresponding to a moment immediately preceding the timing 52 of the forced end of operation of the recording apparatus (see FIG. 4).

A final VOB recording block 38 receives, from the imperfect VOBS acquiring block 11, the VOB#m+1@VOBS#i which is short of data. The final VOB recording block 38 receives the management information produced by the management information generating block 35. The final VOB recording block 38 corrects the navigation information (for example, the search information) in the VOB#m+1@VOBS#i in response to the received management information, and thereby changes the VOB#m+1@VOBS#i into a new VOB#m+1@VOBS#i. The final VOB recording block 38 sends the new VOB#m+1@VOBS#i to the disc drive device 21A. The final VOB recording block 38 controls the disc drive device 21A to record the new VOB#m+1@VOBS#i over the old VOB#m+1@VOBS#i on the rewritable disc 20A. As a result, the old VOB#m+1@VOBS#i on the rewritable disc 20A is updated into the new version having the correct navigation information.

It should be noted that the final VOB recording block 38 may correct the navigation information in the VOB#m+1@VOBS#i in response to the boundary value information and the address information instead of the management information. In this case, the final VOB recording block 38 accesses the parameter memory block 14 to read out the boundary value information and the address information concerning the VOB#1-VOB#m+1@VOBS#i therefrom.

A management information recording block 39 sends the produced management information concerning the VOB#1-VOB#m+1@VOBS#i from the management information generating block 35 to the disc drive device 21A. The management information recording block 39 controls the disc drive device 21A to record the management information concerning the VOB#1-VOB#m+1@VOBS#i on the VTSI#i zone in the rewritable disc 20A. In addition, the management information recording block 39 controls the disc drive device 21A to record the management information concerning the VOB#1-VOB#m+1@VOBS#i on the rewritable disc 20A as VTSI(BUP)#i. Thus, backup data for the management information concerning the VOB#1-VOB#m+1@VOBS#i is recorded on the rewritable disc 20A as VTSI(BUP)#i.

In this way, the data restoring apparatus 10A corrects the imperfect VTS on the rewritable disc 20A into a perfect VTS thereon. Thus, the data restoring apparatus 10A enables video and audio data in the imperfect VTS to be reproduced by a DVD player. Accordingly, the correction of the imperfect VTS into the perfect VTS means the restoration of data recorded on the rewritable disc 20A.

It should be noted that the data restoring apparatus 10A may be signal processing and control portions of a DVD recording and reproducing apparatus or a DVD reproducing apparatus (a DVD player). Alternatively, the data restoring apparatus 10A may be signal processing and control portions of a personal computer. In this case, the disc drive device 21A uses one mounted on the personal computer.

Figure 14:
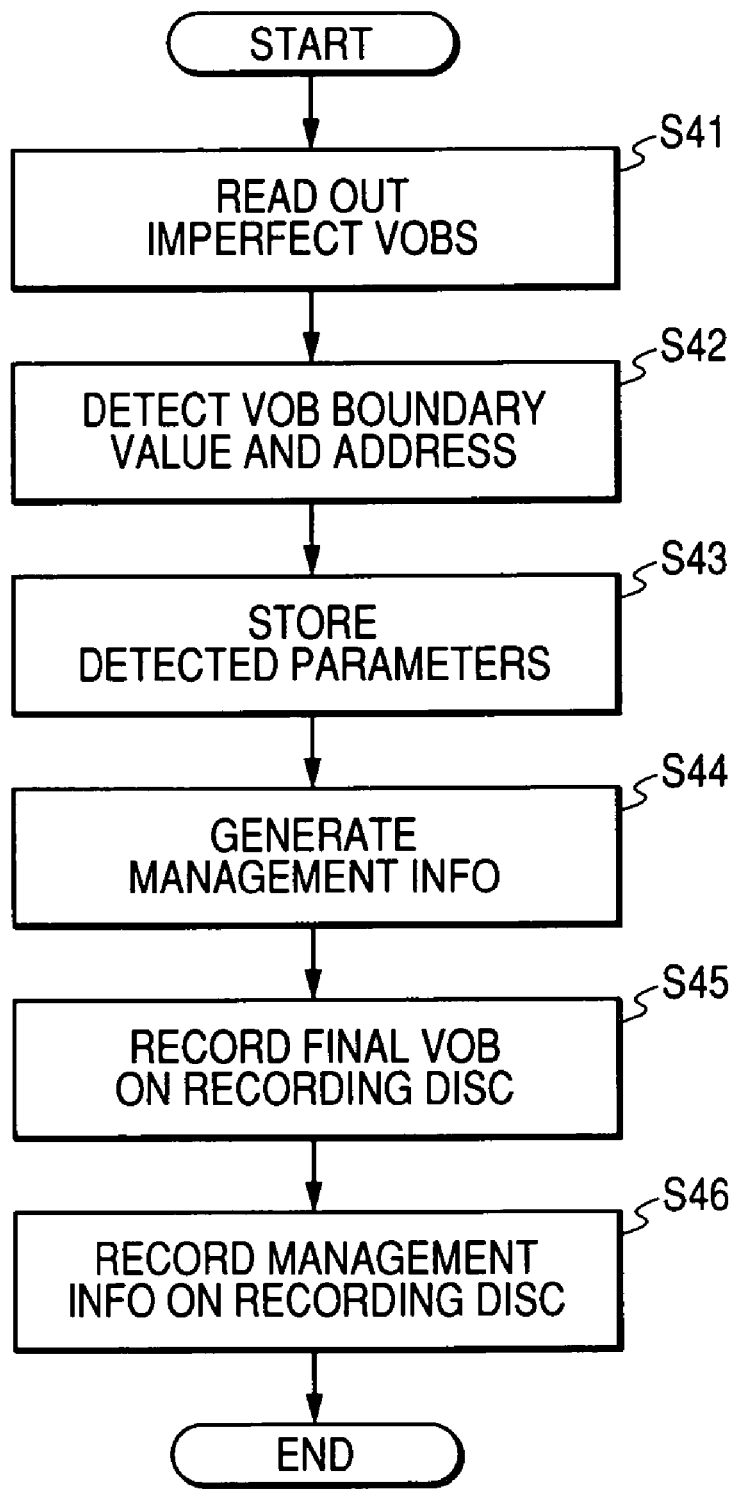
FIG. 14 is a flowchart of a segment of a control program for the data restoring apparatus in FIG. 13.

The data restoring apparatus 10A operates in accordance with a control program (a computer program) stored in its internal ROM or RAM. FIG. 14 is a flowchart of a segment of the control program for restoring on-disc data. The program segment is started when a rewritable disc 20A is placed in the disc drive device 21A.

With reference to FIG. 14, a first step S41 of the program segment controls the disc drive device 21A to scan the rewritable disc 20A in the direction from its inner circumferential edge toward its outer circumferential edge. During the scanning of the rewritable disc 20A, the step S41 checks VTSI in each VTS to search recorded data for an imperfect VOBS about which recorded VTSI and VTSI(BUP) are absent. The step S41 controls the disc drive device 21A to sequentially read out VOBs (VOB#1-VOB#m+1@VOBS#i in FIG. 4) in such an imperfect VOBS from the rewritable disc 20A.

A step S42 following the step S41 detects VOB identifier information in navigation information in each of the VOBs composing the imperfect VOBS. The step S42 gets boundary value information about the VOBs in the imperfect VOBS on the basis of the detected VOB identifier information. In addition, the step S42 extracts VOB start address information from the navigation information in each of the VOBs composing the imperfect VOBS.

A step S43 subsequent to the step S42 stores the boundary value information and the address information (the VOB start address information) for each VOB into the RAM corresponding to the RAM 10D in FIG. 9.

A step S44 following the step S43 reads out, from the RAM, the boundary value information and the address information for the VOBs composing the imperfect VOBS. On the basis of the boundary value information and the address information, the step S44 produces management information (video title set information) concerning the VOB#1-VOB#m+1@VOBS#i. The management information conforms to the DVD-Video standards.

A step S45 subsequent to the step S44 takes the VOB#m+1@VOBS#i (the final VOB) read out by the step S41 and being short of data. In addition, the step S45 takes the management information produced by the step S44. The step S45 corrects the navigation information in the VOB#m+1@VOBS#i in response to the management information, and thereby changes the VOB#m+1@VOBS#i into a new VOB#m+1@VOBS#i. The step S45 controls the disc drive device 21A to record the new VOB#m+1@VOBS#i over the old VOB#m+1@VOBS#i on the rewritable disc 20A. As a result, the old VOB#m+1@VOBS#i on the rewritable disc 20A is updated into the new version having the correct navigation information.

It should be noted that the step S45 may correct the navigation information in the VOB#m+1@VOBS#i in response to the boundary value information and the address information concerning the VOB#1-VOB#m+1@VOBS#i and read out from the RAM instead of the management information produced by the step S44.

A step S46 following the step S45 controls the disc drive device 21A to record the management information concerning the VOB#1-VOB#m+1@VOBS#i on the VTSI#i zone in the rewritable disc 20A. In addition, the step S46 controls the disc drive device 21A to record the management information concerning the VOB#1-VOB#m+1@VOBS#i on the rewritable disc 20A as VTSI(BUP)#i. Thus, backup data for the management information concerning the VOB#1-VOB#m+1@VOBS#i is recorded on the rewritable disc 20A as VTSI(BUP)#1. After the step S46, the current execution cycle of the program segment ends.

Figure 15:
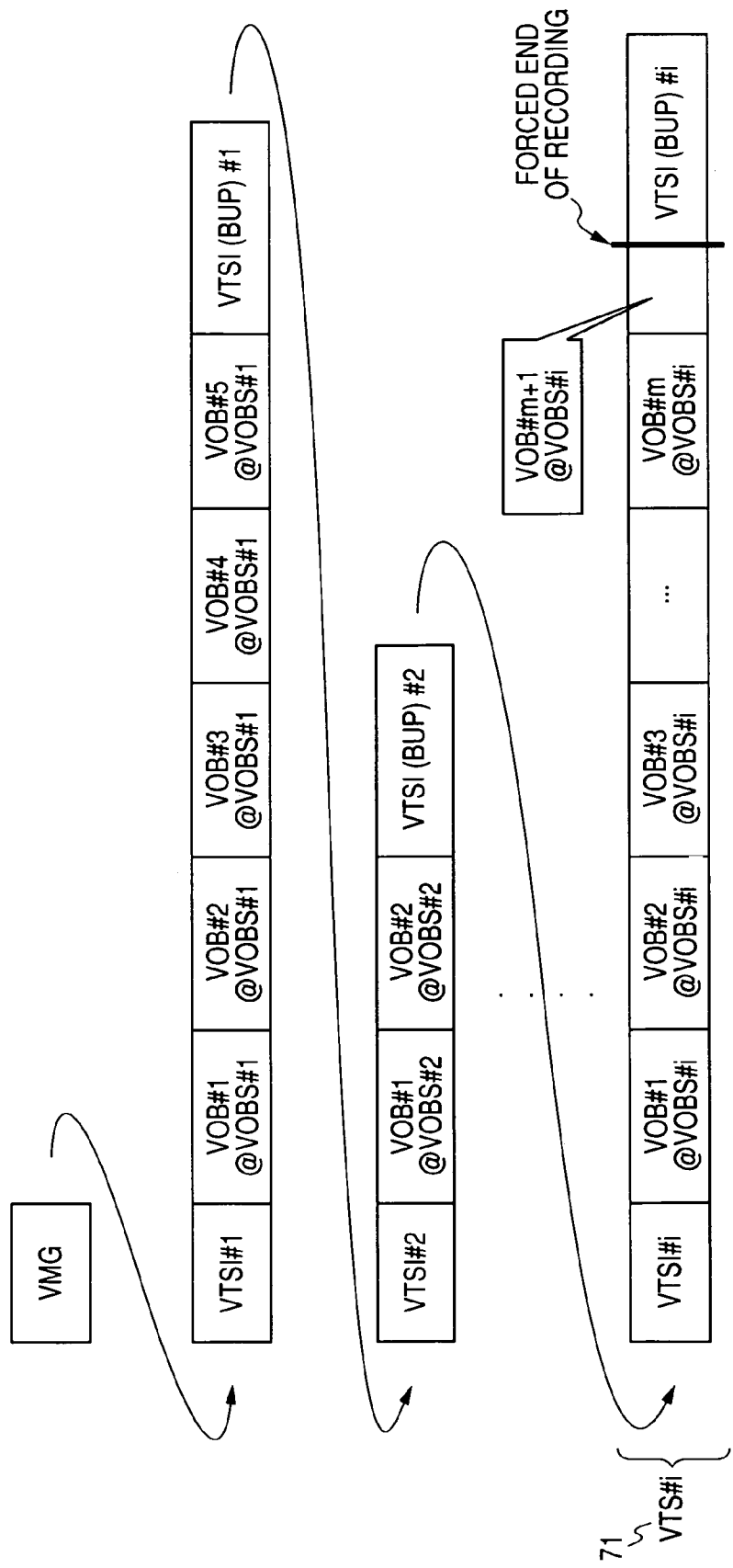
FIG. 15 is a diagram of a sequence of operation steps implemented by the data restoring apparatus in FIG. 13.

As a result of the execution of the steps S41-S46 in FIG. 14, the imperfect VTS recorded on the rewritable disc 20A is corrected into a perfect VTS recorded thereon. Specifically, the correct navigation information for the data-short VOB#m+1@VOBS#i is made, and the VOB#m+1@VOBS#i recorded on the rewritable disc 20A is updated into the new version having the correct navigation information. In addition, the VTSI#i and the VTSI(BUP)#i are made before being recorded on the rewritable disc 20A. Therefore, as shown in FIG. 15, the VTSI#i, the VOB#1-VOB#m+1@VOBS#i, and the VTSI(BUP)#i constitute a perfect VTS#i 71 recorded on the rewritable disc 20A. Thus, the VOB#1-VOB#m+1@VOBS#i can be normally reproduced from the rewritable disc 20A by a DVD player. Accordingly, the correction of the imperfect VTS into the perfect VTS means the restoration of data recorded on the rewritable disc 20A.

In the case where a point at which the recording operation is forced to end corresponds to a position within a VOBU in the VOB#m+1@VOBS#i, the VOBU can not be restored and VOBUs up to one immediately preceding that VOBU (the unrestorable VOBU) can be set in the VOB#1@VOBS#i+1. Accordingly, in this case, the VOBUs up to one immediately preceding the unrestorable VOBU can be reproduced from the rewritable disc 20A by the DVD player. The old VOB#m+1@VOBS#i 63 (see FIG. 12) recorded on the rewritable disc 20A is updated into the correct version, and is hence prevented from forming an ineffective region which can be not recognized.

Forced end of operation of a recording apparatus due to an interruption of the power feed thereto causes an imperfect VTS to be recorded on a rewritable disc 20A. As explained above, the data restoring apparatus 10A can correct the imperfect VTS into a perfect VTS recorded on the rewritable disc 20A. Thus, the data restoring apparatus 10A enables video and audio data in the imperfect VTS to be recognized and reproduced from the rewritable disc 20A by a DVD player.

Since the old VOB#m+1@VOBS#i 63 (see FIG. 12) recorded on the rewritable disc 20A is prevented from forming an ineffective region, the recording area on the rewritable disc 20A can be efficiently used.

What is claimed is:

1. An apparatus for recording data on a recording disc, comprising:
   a first generator for generating a program stream from input video data;
   a second generator for sequentially generating video object units from the program stream generated by the first generator, the generated video object units having navigation portions respectively and composing video objects, the navigation portions being void of ending time information and search information;
   a first recorder for sequentially recording the video object units generated by the second generator on the recording disc without buffering the video object units;
   a detector for detecting ending time information and search information from the program stream generated by the first generator;
   a deciding device for deciding whether or not the first recorder has completed the recording of video object units composing one video object;
   a third generator for generating navigation information which includes the ending time information and the search information detected by the detector, and which corresponds to the last video object recognized by the deciding device; and
   a second recorder for recording the navigation information generated by the third generator on zones in the recording disc which correspond to the navigation portions of the video object units composing the last video object recognized by the deciding device each time the deciding device decides that the first recorder has completed the recording of video object units composing one video object.

2. An apparatus as recited in claim 1, wherein the generation of the video object units by the second generator and the recording of the video object units by the first recorder are in a real-time fashion with respect to the input video data.

3. An apparatus as recited in claim 1, wherein the navigation portions comprise navigation packs respectively.

4. A method of recording data on a recording disc, comprising the steps of:
   (a) generating a program stream from input video data;
   (b) sequentially generating video object units from the program stream generated by the step (a), the generated video object units having navigation portions respectively and composing video objects, the navigation portions being void of ending time information and search information;
   (c) sequentially recording the video object units generated by the step (b) on the recording disc without buffering the video object units;
   (d) detecting ending time information and search information from the program stream generated by the step (a);
   (e) deciding whether or not the step (c) has completed the recording of video object units composing one video object;
   (f) generating navigation information which includes the ending time information and the search information detected by the step (d), and which corresponds to the last video object recognized by the step (e); and
   (g) recording the navigation information generated by the step (f) on zones in the recording disc which correspond to the navigation portions of the video object units composing the last video object recognized by the step (e) each time the step (e) decides that the step (c) has completed the recording of video object units composing one video object.

5. A method as recited in claim 4, wherein the generation of the video object units by the step (b) and the recording of the video object units by the step (c) are in a real-time fashion with respect to the input video data.

6. A method as recited in claim 4, wherein the navigation portions comprise navigation packs respectively.

7. An apparatus for recording data on a recording disc according to the DVD-Video standards, comprising:
   a first generator for generating a program stream from input video data;
   a second generator for sequentially generating video object units from the program stream generated by the first generator, the generated video object units having navigation portions respectively and composing video objects, the generated video object units having video data portions or audio data portions, the navigation portions storing first navigation information void of ending time information and search information;

a first recorder for sequentially recording the video object units generated by the second generator on the recording disc without buffering the video object units;

a detector for detecting ending time information and search information from the program stream generated by the first generator;

a deciding device for deciding whether or not the first recorder has completed the recording of video object units composing one video object;

a third generator for generating second navigation information which includes the ending time information and the search information detected by the detector, and which corresponds to the last video object recognized by the deciding device; and a second recorder for writing the second navigation information generated by the third generator over the recorded first navigation information in zones in the recording disc which correspond to the navigation portions of the video object units composing the last video object recognized by the deciding device each time the deciding device decides that the first recorder has completed the recording of video object units composing one video object.

8. An apparatus as recited in claim 7, wherein the generation of the video object units by the second generator and the recording of the video object units by the first recorder are in a real-time fashion with respect to the input video data.

9. An apparatus as recited in claim 7, wherein the navigation portions comprise navigation packs respectively.

10. A method of recording data on a recording disc according to the DVD-Video standards, comprising the steps of:

(a) generating a program stream from input video data;

(b) sequentially generating video object units from the program stream generated by the step (a), the generated video object units having navigation portions respectively and composing video objects, the generated video object units further having video data portions or audio data portions, the navigation portions storing first navigation information void of ending time information and search information;

(c) sequentially recording the video object units generated by the step (b) on the recording disc without buffering the video object units;

(d) detecting ending time information and search information from the program stream generated by the step (a);

(e) deciding whether or not the step (c) has completed the recording of video object units composing one video object;

(f) generating second navigation information which includes the ending time information and the search information detected by the step (d), and which corresponds to the last video object recognized by the step (e); and (g) writing the second navigation information generated by the step (f) over the recorded first navigation information in zones in the recording disc which correspond to the navigation portions of the video object units composing the last video object recognized by the step (e) each time the step (e) decides that the step (c) has completed the recording of video object units composing one video object.

11. A method as recited in claim 10, wherein the generation of the video object units by the step (b) and the recording of the video object units by the step (c) are in a real-time fashion with respect to the input video data.

12. A method as recited in claim 10, wherein the navigation portions comprise navigation packs respectively.

* * * * *